US009849777B2

(12) United States Patent
Yoshimura et al.

(10) Patent No.: US 9,849,777 B2
(45) Date of Patent: Dec. 26, 2017

(54) VEHICLE FOUR-WHEEL DRIVE APPARATUS

(71) Applicant: Toyota Jidosha Kabushiki Kaisha, Toyota-shi, Aichi-ken (JP)

(72) Inventors: Takahiro Yoshimura, Toyota (JP); Ryota Horie, Nagoya (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 202 days.

(21) Appl. No.: 14/877,417

(22) Filed: Oct. 7, 2015

(65) Prior Publication Data

US 2016/0101689 A1   Apr. 14, 2016

(30) Foreign Application Priority Data

Oct. 8, 2014  (JP) .................................. 2014-207606

(51) Int. Cl.

| | |
|---|---|
| *F16H 37/06* | (2006.01) |
| *B60K 17/344* | (2006.01) |
| *B60K 17/35* | (2006.01) |
| *B60K 23/08* | (2006.01) |

(52) U.S. Cl.
CPC ............ *B60K 17/344* (2013.01); *B60K 17/35* (2013.01); *B60K 17/3515* (2013.01); *B60K 23/0808* (2013.01); *B60K 2023/085* (2013.01)

(58) Field of Classification Search
CPC ........ F16H 1/222; B60K 17/36; B60K 17/344

USPC ............... 74/665 F, 665 GB, 665 GC, 665 H
See application file for complete search history.

(56) References Cited

U.S. PATENT DOCUMENTS

| | | | |
|---|---|---|---|
| 6,877,573 B2* | 4/2005 | Hasegawa ............... | F16D 55/40 180/24.01 |
| 7,331,896 B1* | 2/2008 | Kroppe ................ | B60K 17/346 475/221 |
| 2010/0094519 A1* | 4/2010 | Quehenberger ....... | B60K 17/35 701/69 |

FOREIGN PATENT DOCUMENTS

| | | |
|---|---|---|
| JP | 2013-159300 A | 8/2013 |
| JP | 2015-193368 A | 11/2015 |
| WO | 2013-186076 A1 | 12/2013 |
| WO | 2015-145241 A1 | 10/2015 |

* cited by examiner

*Primary Examiner* — Ha Dinh Ho
(74) *Attorney, Agent, or Firm* — Dinsmore & Shohl LLP

(57) ABSTRACT

By driving a first electromagnetic solenoid and a second electromagnetic solenoid, if first cams of a first thrust force amplification mechanism and a second thrust force amplification mechanism are connected to non-rotary members, since second cams are rotated at rotating speeds that are proportional to a vehicle speed V, the relative rotations between the first cam and the second cam increase. Therefore, the first thrust force amplification mechanism and the second thrust force amplification mechanism can be actuated quickly, to thereby switch connection/disconnection states of the first connection/disconnection mechanism and the second connection/disconnection mechanism quickly.

7 Claims, 13 Drawing Sheets

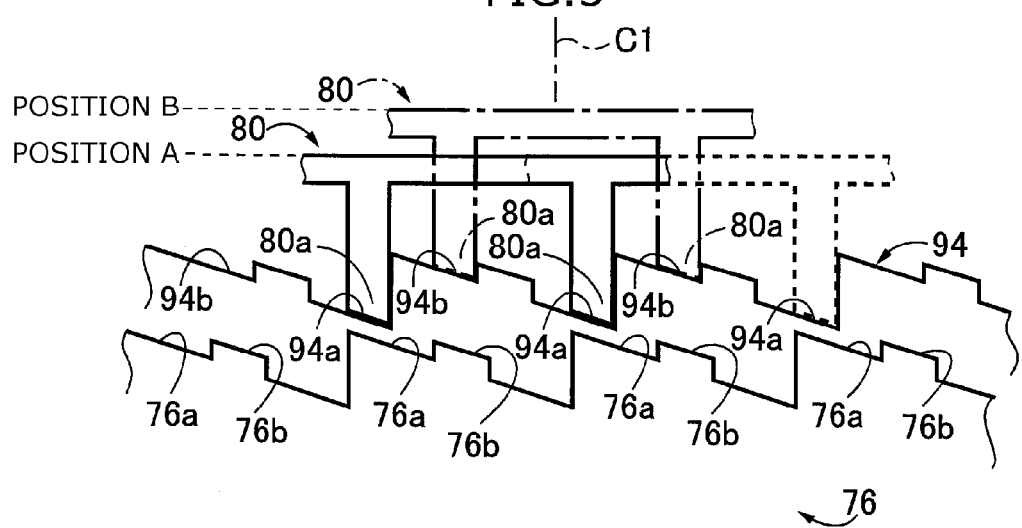

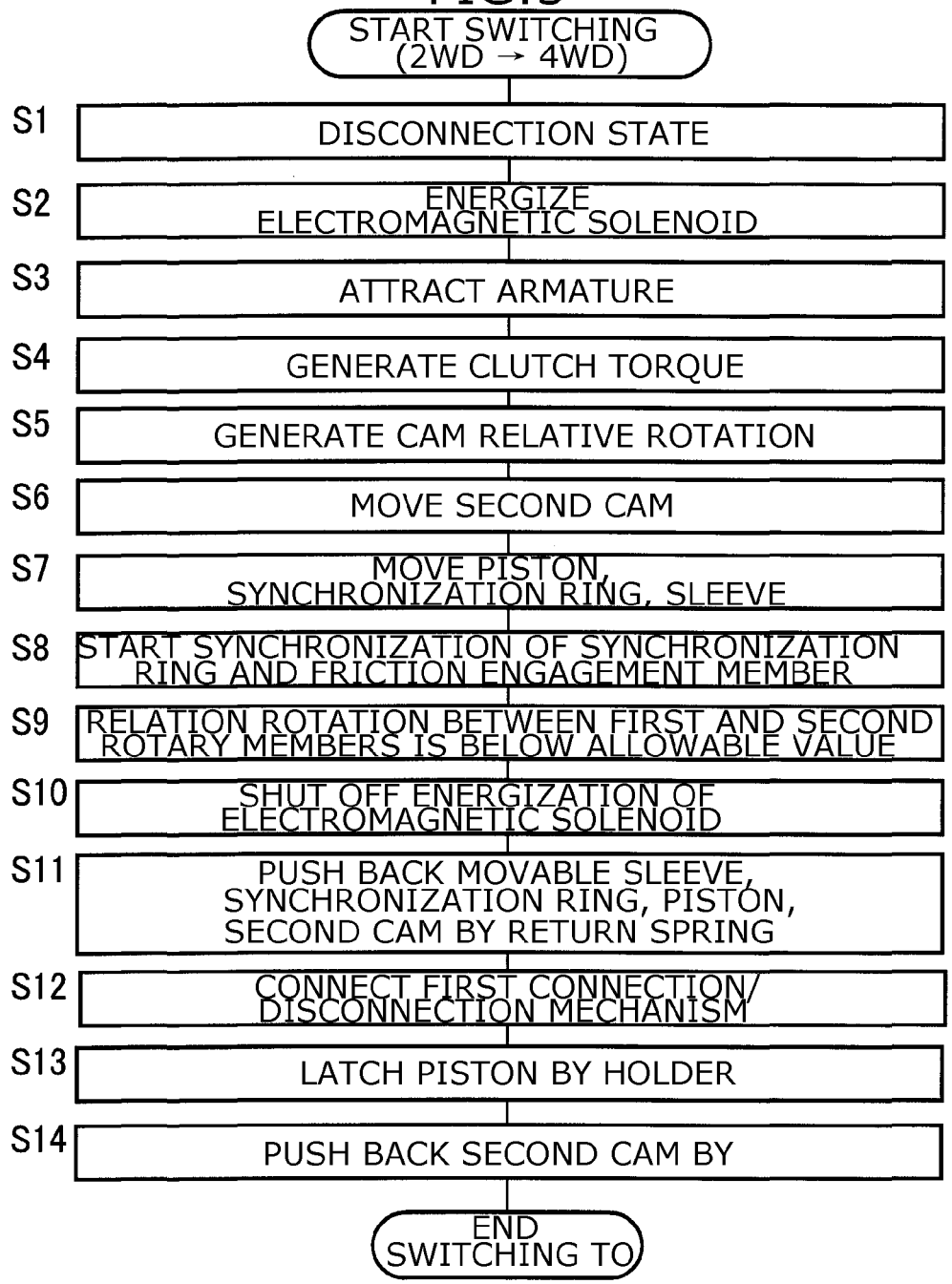

FIG.10 VEHICLE FOUR-WHEEL DRIVE APPARATUS

SECOND CONNECTION/DISCONNECTION MECHANISM

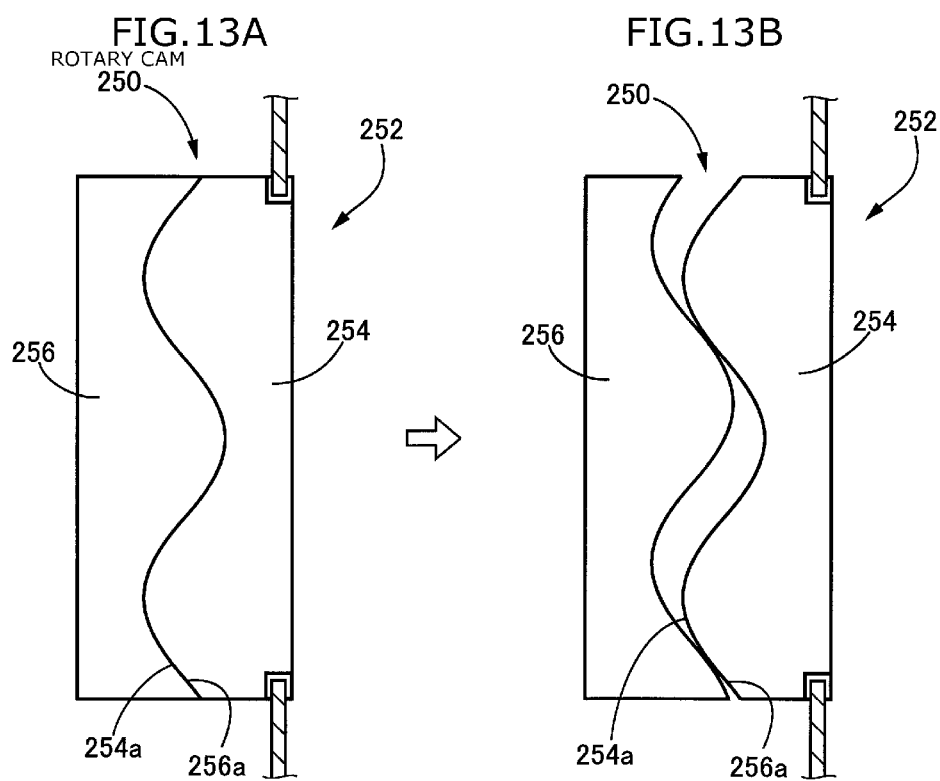

VEHICLE FOUR-WHEEL DRIVE APPARATUS

INCORPORATION BY REFERENCE

The disclosure of Japanese Patent Application No. 2014-207606 filed on Oct. 8, 2014 including the specification, drawings and abstract is incorporated herein by reference in its entirety.

BACKGROUND OF THE INVENTION

1. Field of the Invention

The invention relates to a vehicle four-wheel drive apparatus, and particularly to a four-wheel drive apparatus having a connection/disconnection mechanism that selectively connects or disconnects a power transmission for transmitting power to a propeller shaft of auxiliary drive wheels.

2. Description of Related Art

A vehicle four-wheel drive apparatus for transmitting power of a drive source to main drive wheels and selectively transmitting a portion of the power to auxiliary drive wheels is well known. Further, in the vehicle four-wheel drive apparatus, a four-wheel drive apparatus is proposed, which is provided with a first connection/disconnection mechanism that connects or disconnects a power transmission between a transfer for distributing the power of the drive source to the auxiliary drive wheels and a propeller shaft and a second connection/disconnection mechanism that connects or disconnects a power transmission between the downstream side of the propeller shaft and the auxiliary drive wheels, and to disconnect these connection/disconnection mechanisms during two-wheel driving traveling to eliminate traction of the propeller shaft and the like and improve fuel efficiency. The vehicle described in Japanese Patent Application Publication No. 2013-159300 (JP 2013-159300 A) is an example thereof.

The vehicle described in JP 2013-159300 A is configured to have a first connection/disconnection mechanism (the first connection/disconnection mechanism) that is provided in a power transmission device which is arranged on the front wheel side and that connects or disconnects a power transmission between a first rotation shaft and an output unit, and an axle disconnect that is a second connection/disconnection mechanism (the second connection/disconnection mechanism) and that connects or disconnects a power transmission between a propeller shaft and rear wheels. Here, the first connection/disconnection mechanism that is arranged on the front wheel side is a dog clutch that connects or disconnects the first rotation shaft to or from the output unit by selectively engaging or disengaging teeth that are formed on a connection/disconnection member which is splined with the first rotation shaft and thus is not rotatable relative to it to or from opposite teeth that are formed on the output unit. In addition, as for the first connection/disconnection mechanism, if an electromagnet constituting an actuator is energized, the connection/disconnection member is connected by moving toward one end (an engagement position) in an axial direction, and if the power supply is stopped, the connection/disconnection member is disconnected by moving toward the other end (a disengagement position) in the axial direction by an action force of a return spring. Further, the axle disconnect (the second connection/disconnection mechanism) is configured of a multi-plate clutch that can adjust a torque transmission capacity.

In the vehicle of JP 2013-159300 A, the second connection/disconnection mechanism is configured of the multi-plate clutch. However, when the first connection/disconnection mechanism and the second connection/disconnection mechanism are disconnected, even if a torque of the multi-plate clutch that is the second connection/disconnection mechanism is controlled to zero, a traction torque is generated at the multi-plate clutch and is transmitted to the first connection/disconnection mechanism side via the propeller shaft, and thus becomes a resistive force for moving a sleeve (the connection/disconnection member) in the axial direction when the first connection/disconnection mechanism that is the dog clutch is disconnected. Therefore, in order to ensure a thrust force that is required for switching of the first connection/disconnection mechanism and a responsivity of the switching, the action force that is applied by the return spring to the disengagement side shall be increased. However, as a result of increasing the action force that is applied by the return spring, an electromagnetic force that is required for connecting the first connection/disconnection mechanism becomes large, and thus the electromagnetic solenoid becomes large, resulting in that mountability of the electromagnetic solenoid is degraded. Further, in the first connection/disconnection mechanism of JP 2013-159300 A, even if the electromagnetic solenoid is disconnected when being energized and is connected by the return spring when the power supply is stopped, the electromagnetic solenoid becomes large in order to ensure the responsivity of the switching of the first connection/disconnection mechanism, and thus the mountability of the electromagnetic solenoid is degraded.

Further, when the dog clutch is switched by for example, a motor, a reduction gear is required to obtain the thrust force that is required for the switching, and thus the responsivity of the switching is decreased. Further, when the dog clutch is switched by for example, a hydraulic mechanism, although the thrust force that is required for the switching can be secured, there is a problem that the responsivity of the switching is decreased as the oil viscosity is increased when the oil temperature is low, for example. Moreover, switching of a drive state of a four-wheel drive apparatus is based on switching of connection/disconnection states of the first connection/disconnection mechanism and the second connection/disconnection mechanism, and the responsivity thereof is dependent upon the connection/disconnection mechanism whose operating time that is required for the switching is longer among these connection/disconnection mechanisms. Therefore, if the operating time of any one of the connection/disconnection mechanisms becomes longer, the responsivity of the switching of the drive state of the four-wheel drive is decreased.

SUMMARY OF THE INVENTION

An object of the invention is to provide a vehicle four-wheel drive apparatus that includes a first connection/disconnection mechanism for connecting or disconnecting a power transmission between a transfer and a propeller shaft and a second connection/disconnection mechanism for connecting or disconnecting a power transmission between the propeller shaft and auxiliary drive wheels, the vehicle four-wheel drive apparatus having a good responsivity of switching of drive state by switching of the first connection/disconnection mechanism and the second connection/disconnection mechanism.

A vehicle four-wheel drive apparatus according to one aspect of the invention (a) includes a transfer for transmitting a portion of driving force that is output from a drive source to auxiliary drive wheels, a propeller shaft that is interposed between the transfer and the auxiliary drive wheels for transmitting the power from the transfer to the auxiliary drive wheels, a first connection/disconnection mechanism that is provided in the transfer for selectively connecting or disconnecting the power transmitted to the propeller shaft via the transfer, and a second connection/disconnection mechanism that is provided between the downstream side of the propeller shaft and the auxiliary drive wheels for selectively connecting or disconnecting the power between the propeller shaft and the auxiliary drive wheels, (b) is further provided with a first control clutch, a first actuator and a first thrust force amplification mechanism for switching a connection/disconnection state of the first connection/disconnection mechanism, (c) is further provided with a second control clutch, a second actuator and a second thrust force amplification mechanism for switching connection/disconnection state of the second connection/disconnection mechanism, (d) wherein each of the first connection/disconnection mechanism and the second connection/disconnection mechanism has a switching member, the switching member is configured to be movable in an axial direction of a rotation axis so as to obtain a first position at which a power input shaft and a power output shaft that are rotatable around the rotation axis respectively are connected and a second position at which the power input shaft and the power output shaft that are rotatable around the rotation axis respectively are disconnected, (e) wherein each of the first thrust force amplification mechanism and the second thrust force amplification mechanism is configured to have a pair of rotary members that is rotatable around the rotation axis, the pair of rotary members is configured to be axially separated by being rotated relative to each other, one of the pair of rotary members causes the switching member of each connection/disconnection mechanism to move in one direction of the rotation axis, (f) wherein the vehicle four-wheel drive apparatus is configured such that a rotation suppression torque is added to the other one of the pair of rotary members by the first control clutch through the first actuator, and a rotation suppression torque is added to the other one of the pair of rotary members by the second control clutch through the second actuator, (g) wherein one of the pair of rotary members of each of the first thrust force amplification mechanism and the second thrust force amplification mechanism is connected to a rotary member whose rotating speed is increased in proportion to a vehicle speed in a non-rotatable relatively manner respectively, (h) at least one of the first connection/disconnection mechanism and the second connection/disconnection mechanism is provided with a synchronization mechanism for synchronizing the rotations of the power input shaft and the power output shaft.

In this way, if the rotation suppression torque is added to the other one of the pair of rotary members of the first thrust force amplification mechanism by the first actuator, the pair of rotary members is rotated relative to each other, one of the pair of rotary members acts on the switching member of the first connection/disconnection mechanism in one direction of the rotation axial direction, and thus the switching member is moved in the rotation axial direction to switch the connection/disconnection state of the first connection/disconnection mechanism. Similarly, if the rotation suppression torque is added to the other one of the pair of rotary members of the second thrust force amplification mechanism by the second actuator, the pair of rotary members is rotated relative to each other, one of the pair of rotary members acts on the switching member of the second connection/disconnection mechanism in one direction of the rotation axial direction, and thus the switching member is moved in the rotation axial direction to switch the connection/disconnection state of the second connection/disconnection mechanism. Herein, one of the pair of rotary members of each of the first thrust force amplification mechanism and the second thrust force amplification mechanism is connected to the rotary member whose rotating speed is increased in proportion to the vehicle speed in a non-rotatable relatively manner respectively, and thus the relative rotating speed between the pair of rotary members is also high. Therefore, the first thrust force amplification mechanism and the second thrust force amplification mechanism can be actuated quickly thereby to switch the connection/disconnection state of each of the first connection/disconnection mechanism and the second connection/disconnection mechanism quickly. Thus, since the connection/disconnection state of each of the first connection/disconnection mechanism and the second connection/disconnection mechanism can be switched quickly, a connection/disconnection mechanism with a low responsivity is not affected when switching the drive state of the four-wheel drive apparatus and thereby decrease of the responsivity is suppressed. Further, since at least one of the first connection/disconnection mechanism and the second connection/disconnection mechanism is provided with the synchronization mechanism for synchronizing the rotations of the power input shaft and the power output shaft, the first connection/disconnection mechanism and the second connection/disconnection mechanism can be connected with the power input shaft and the power output shaft being rotated in synchronization by the synchronization mechanism during traveling.

Further, in the vehicle four-wheel drive apparatus as described above, (a) each of the first thrust force amplification mechanism and the second thrust force amplification mechanism may be a ball cam or a rotary cam. In this way, if a relative rotation occurs between the pair of rotary members, the ball cam or the rotary cam is actuated and the pair of rotary members is axially expanded, and thus the torque of the first control clutch and the second control clutch is amplified and output through the ball cam or the rotary cam.

Further, in the vehicle four-wheel drive apparatus as described above, each of the first actuator and the second actuator may be configured of an electromagnetic solenoid, a motor mechanism or a hydraulic mechanism. In this way, engagement states of the first control clutch and the second control clutch can be switched by driving the electromagnetic solenoid, the motor mechanism or the hydraulic mechanism.

Further, in the vehicle four-wheel drive apparatus as described above, it may be further provided with a fixing mechanism for maintaining the connection/disconnection states of the first connection/disconnection mechanism and the second connection/disconnection mechanism. In this way, even if the first actuator and the second actuator are not actuated, the connection/disconnection states of the first connection/disconnection mechanism and the second connection/disconnection mechanism can be maintained by the fixing mechanism, and the energy for maintaining the connection/disconnection states of the first connection/disconnection mechanism and the second connection/disconnection mechanism can be eliminated.

Further, in the vehicle four-wheel drive apparatus as described above, an electronic control coupling may be provided in a power transmission path between the propeller shaft and the auxiliary drive wheels for controlling the torque transmitted to the auxiliary drive wheels. In this way, the driving force that is transmitted to the auxiliary drive wheels can be properly adjusted by the electronic control coupling.

Further, in the vehicle four-wheel drive apparatus as described in the previous paragraph, (a) it may be provided with a control device for switching connection or disconnection of the first connection/disconnection mechanism and the second connection/disconnection mechanism, and (b) in a case where each of the first connection/disconnection mechanism and the second connection/disconnection mechanism is provided with the synchronization mechanism, when the first connection/disconnection mechanism and the second connection/disconnection mechanism are to be connected during traveling, the control device may actuate the first actuator and the second actuator in a state where the electronic control coupling is released. In this way, in a case where the first connection/disconnection mechanism and the second connection/disconnection mechanism both are provided with the synchronization mechanisms, they can be connected while being rotated individually in synchronization in the first connection/disconnection mechanism and the second connection/disconnection mechanism. Therefore, the first actuator and the second actuator can be actuated at the same time or substantially the same time to connect the first connection/disconnection mechanism and the second connection/disconnection mechanism quickly. Further, the load when being rotated in synchronization can be shared among the synchronization mechanisms by releasing the electronic control coupling.

Further, in the vehicle four-wheel drive apparatus as described in the paragraph before the previous paragraph, (a) it may be provided with a control device for switching connection or disconnection of the first connection/disconnection mechanism and the second connection/disconnection mechanism, and (b) in a case where only one of the first connection/disconnection mechanism and the second connection/disconnection mechanism is provided with the synchronization mechanism, when the first connection/disconnection mechanism and the second connection/disconnection mechanism are to be connected during traveling, the control device may engage the electronic control coupling and actuates the first actuator and the second actuator. In this way, in a state where the electronic control coupling is engaged, if rotation synchronization of the connection/disconnection mechanism that is provided with the synchronization mechanism is completed, the connection/disconnection mechanism that is not provided with the synchronization mechanism is also rotated in synchronization and can be connected. Therefore, the electronic control coupling, the first actuator and the second actuator can be actuated at the same time or substantially the same time, to connect the first connection/disconnection mechanism and the second connection/disconnection mechanism quickly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a schematic view illustrating an operation principle of latching a piston by a holder of FIG. 2, and is a diagram presenting a second cam, a piston, and a holder in a circumferential direction;

FIG. 5 is a flowchart showing a process when the transfer of FIG. 2 is switched from the two-wheel drive to the four-wheel drive;

FIG. 13A is a diagram schematically illustrating a structure in a case where a first thrust force amplification mechanism is configured of a rotary cam in a state in which a first cam and a second cam are rotated integrally; and FIG. 13B is a diagram schematically illustrating a structure in a case where a first thrust force amplification mechanism is configured of a rotary cam in a state in which a first cam and a second cam are rotated relative to each other.

DETAILED DESCRIPTION OF EMBODIMENTS

Hereinafter, embodiments of the invention will be described with reference to the drawings. The drawings are appropriately simplified or modified, and dimensional ratios and shapes of respective sections may be not necessarily precisely depicted in the following embodiments.

Figure 1:
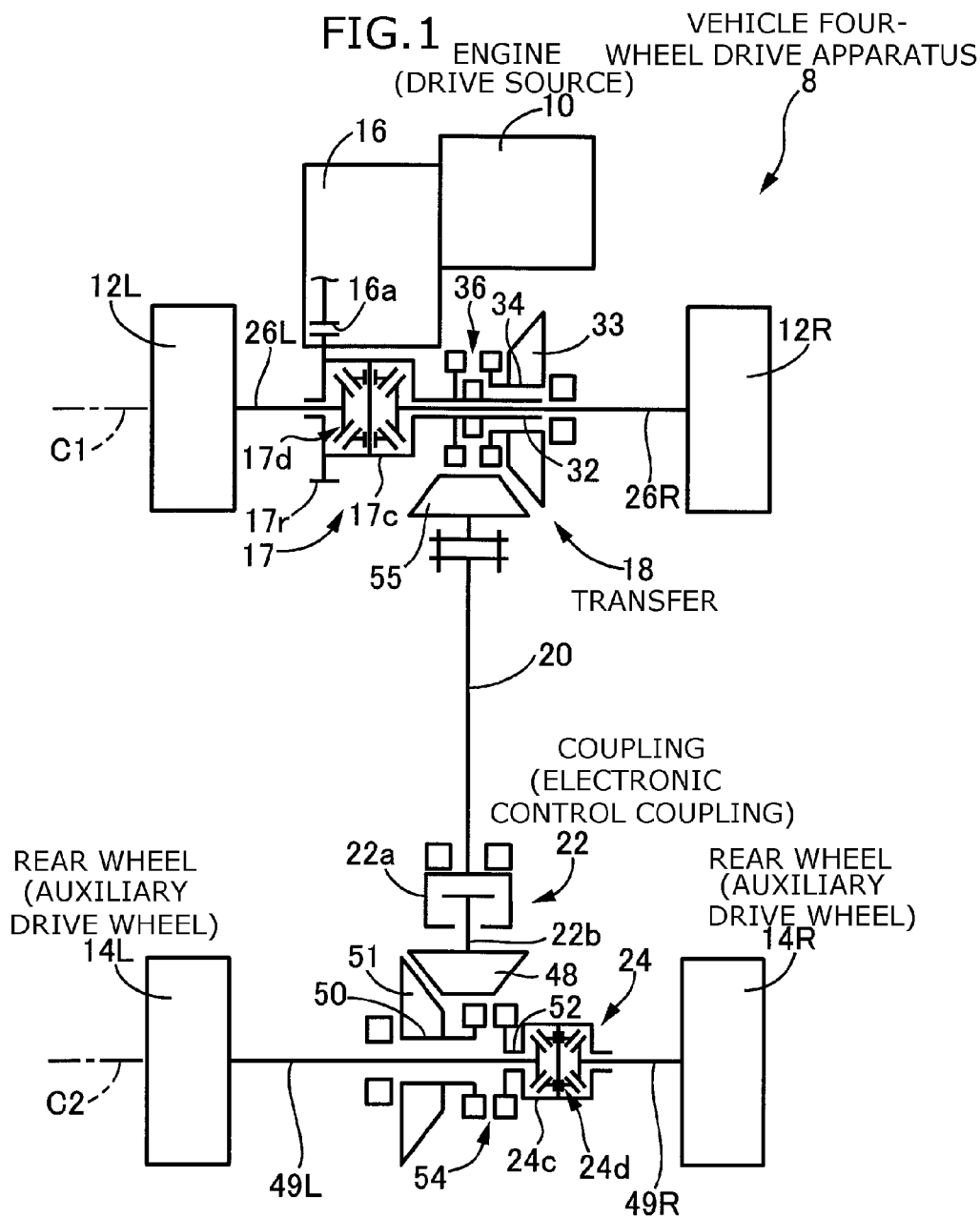
FIG. 1 is an overall view schematically illustrating a configuration of a vehicle four-wheel drive apparatus that is an embodiment of the invention.

FIG. 1 is an overall view schematically illustrating a configuration of a vehicle four-wheel drive apparatus 8 (hereinafter, referred to as "four-wheel drive apparatus 8") that is an embodiment of the invention. In FIG. 1, the four-wheel drive apparatus 8 is a drive apparatus based on a FF vehicle that uses an engine 10 as a drive source and has a first power transmission path for transmitting driving force of the engine 10 to front wheels 12L and 12R (referred to as "front wheels 12" if there is no need to distinguish) and a second power transmission path for transmitting the driving force of the engine 10 to rear wheels 14L and 14R (referred to as "rear wheels 14" if there is no need to distinguish). The four-wheel drive apparatus 8 is configured to include an automatic transmission 16, a front differential 17, a transfer 18, a propeller shaft 20, a coupling 22, a rear differential 24 and the like. Although not shown in FIG. 1, a torque converter that is a hydraulic transmission is provided between the engine 10 and the automatic transmission 16. Note that, the rear wheels 14 correspond to the auxiliary drive wheels of the invention.

The automatic transmission 16 is provided in a power transmission path between the engine 12 and the front differential 17, and is configured of a stepped automatic transmission including for example, a plurality of planetary gear devices and a friction engagement device (clutch, brake). Further, since the automatic transmission 16 is well known in the art, a description of specific structure and operation thereof is omitted.

The front differential 17 (front differential gear) is configured to include a casing 17c and a differential mechanism 17d that is configured of well-known bevel gears, and transmits the driving force while giving an appropriate differential rotation to left and right front axles 26L and 26R (referred to as "front wheel axle 26" if there is no need to distinguish) of the front wheels 14. A ring gear 17r is formed in the casing 17c of the front differential 17, and is engaged with an output gear 16a that is an output rotary member of the automatic transmission 16. Therefore, the driving force output from the automatic transmission 16 is input to the ring gear 17r. Further, since the front differential 17 is well known in the art, a description of specific structure and operation thereof is omitted.

The transfer 18 is provided side by side with respect to the front differential 17 in an axial direction of the front wheel axle 26. The transfer 18 is configured to include a first rotary member 32 that is connected to the casing 17c of the front differential 17, a second rotary member 34 that is formed with a ring gear 33 for transmitting the driving force to the rear wheels 14, and a first connection/disconnection mechanism 36 that is configured of a dog clutch (engagement clutch) and that selectively connects or disconnects the power transmitted to the propeller shaft 20 via the transfer 18. Each of the first rotary member 32, the second rotary member 34, and the first connection/disconnection mechanism 36 is disposed around a rotation axis C1 of the front wheel axle 26. In addition, the structure and operation of the first connection/disconnection mechanism 36 will be described later. The propeller shaft 20 is interposed between the second rotary member 34 that functions as an output shaft of the transfer 18 and the coupling 22 and the rear wheels 14 (auxiliary drive wheels), and transmits the driving force from the transfer 18 to the rear wheels 14. Note that, the first rotary member 32 corresponds to the power input shaft and the rotary member whose rotating speed is increased in proportion to the vehicle speed of the invention, and the second rotary member 34 corresponds to the power output shaft of the invention.

The coupling 22 (corresponding to the electronic control coupling of the invention) is provided between the propeller shaft 20 and the rear differential 24, and transmits a torque between one rotary element 22a which is connected to the propeller shaft 20 and the other rotary element 22b on the side of the rear wheels 14. The coupling 22 is an electronic control coupling that is configured of for example, a wet multi-plate clutch, and can change a torque distribution between the front wheels and the rear wheels continuously from 100:0 to 50:0 by controlling the transmitted torque of the coupling 22. Specifically, when a current is supplied to an electromagnetic solenoid (not shown) for controlling the transmitted torque of the coupling 22, the coupling 22 is engaged by an engagement force that is proportional to the current value. For example, when no current is supplied to the electromagnetic solenoid, the engagement force of the coupling 22 is zero, that is, the transmitted torque is zero, and the torque distribution between the front wheels and the rear wheels is 100:0. Further, if the current of the electromagnetic solenoid is increased and thus the coupling 22 is completely engaged, the torque distribution between the front wheels and the rear wheels is 50:50. Thus, the torque distribution that is transmitted to the rear wheel side is increased as the current value that is supplied to the electromagnetic solenoid is increased, and by controlling the current value, it is possible to continuously change the torque distribution between the front wheels and the rear wheels. Further, since the coupling 22 is well known in the art, a description of specific structure and operation thereof is omitted.

The other rotary element 22b of the coupling 22 is connected to a drive pinion 48. The drive pinion 48 is engaged with a ring gear 51 formed on a third rotary member 50 that is rotatable around a rotation axis C2 of rear wheel axle 49. In addition, a fourth rotary member 52 is disposed side by side with respect to the third rotary member 50 in the axial direction such that it is rotatable around the rotation axis C2 of rear wheel axle 49.

A second connection/disconnection mechanism 54 is provided between the downstream side of the propeller shaft 20 (coupling 22) and the rear wheels 14, and selectively connects or disconnects a power transmission between the propeller shaft 20 and the rear wheels 14. More specifically, the second connection/disconnection mechanism 54 is provided between the third rotary member 50 and the fourth rotary member 52 and around the rotation axis C2 of the rear wheel axle 49, and selectively connects or disconnects the third rotary member 50 and the fourth rotary member 52. In addition, the structure and operation of the second connection/disconnection mechanism 54 will be described later. Note that, the third rotary member 50 corresponds to the power input shaft of the invention, and the fourth rotary member 52 corresponds to the power output shaft and the rotary member whose rotating speed is increased in proportion to the vehicle speed of the invention.

The rear differential 24 is configured to include a casing 24c and a differential mechanism 24d that is configured of well-known bevel gears. Further, since the rear differential 24 is well known in the art, a description of specific structure and operation thereof omitted.

Figure 2:
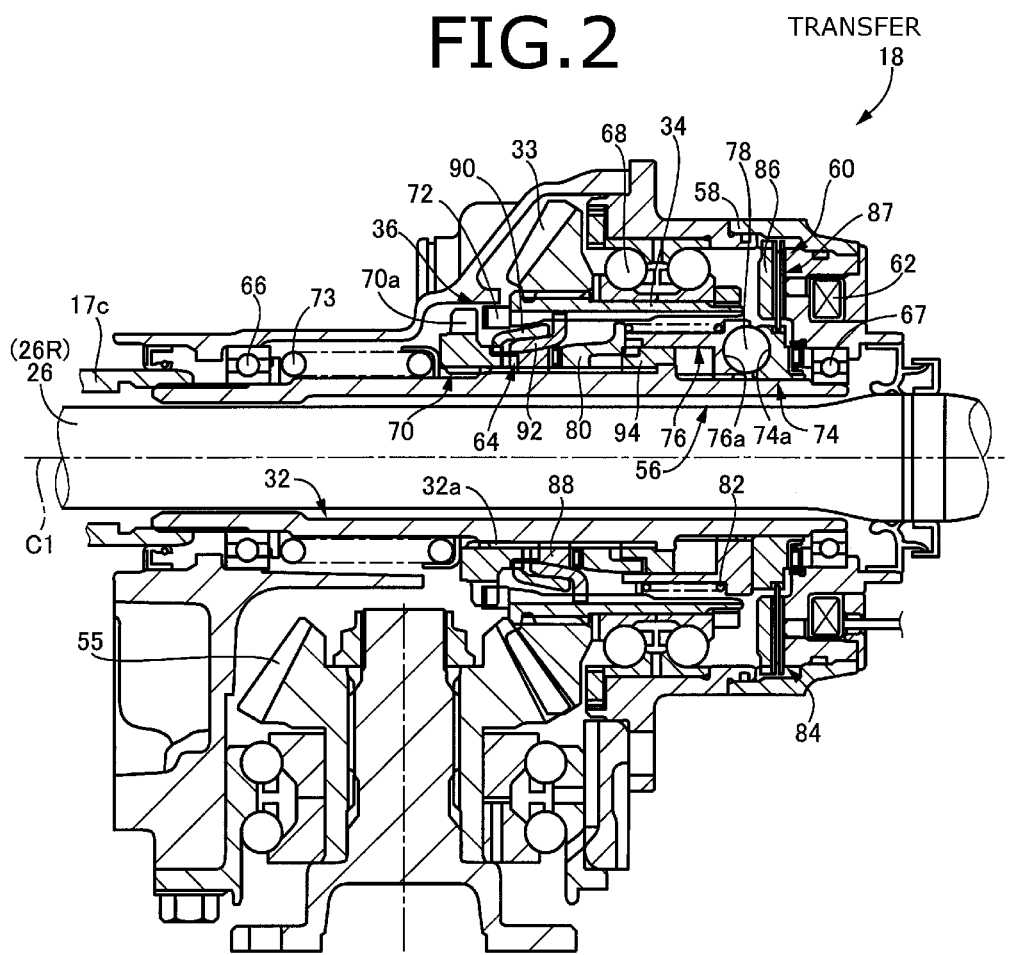
FIG. 2 is a sectional view illustrating a structure of a transfer of FIG. 1.

FIG. 2 is a sectional view illustrating a structure around the transfer 18. The transfer 18 is provided between the casing 17c of the front differential 17 and a driven pinion 55 that is connected to the propeller shaft 20 and around the rotation axis C1 of the front wheel axle 26 (26R), and transmits a portion of the driving force that is output from the engine 10 to the rear wheels (auxiliary drive wheels).

The transfer 18 is configured to include the first rotary member 32 of a cylindrical shape that is splined with the casing 17c of the front differential 17 and is rotatable around the rotation axis C1 of the front wheel axle 26, the second rotary member 34 of a cylindrical shape that is provided with the ring gear 33 engaged with the driven pinion 55 and is rotatable around the rotation axis C1 of the front wheel axle 26 as the first rotary member 32, the first connection/disconnection mechanism 36 that has the dog clutch (engagement clutch) and selectively connects or disconnects the first rotary member 32 and the second rotary member 34; a first thrust force amplification mechanism 56 that generates a thrust force for switching a connection/disconnection state of the first connection/disconnection mechanism 36; a first control clutch 60 that is provided between a first cam 74 (which will be described later) of the first thrust force amplification mechanism 56 and a transfer casing 58 that is the non-rotary member, a first electromagnetic solenoid 62 that is used to adjust (control) an engagement force of the first control clutch 60, and a first synchronization mechanism 64 that functions as a rotation synchronization device when connecting the first rotary member 32 and the second rotary member 34 by the first connection/disconnection mechanism 36. These members are all disposed around the rotation axis C1. Note that, the first synchronization mechanism 64 corresponds to the synchronization mechanism of the invention.

The first rotary member 32 is disposed radially outside of the front wheel axle 26, and is supported such that it is rotatable around the rotation axis C1 as the front wheel axle 26. Specifically, ball bearings 66 and 67 are fitted at both ends of the first rotary member 32 in the axial direction, and the first rotary member 32 is supported by these ball bearings 66 and 67 in the transfer casing 58 such that it is rotatable. Further, an end on the side close to the front differential 17 (left side in the drawing) is splined with the casing 17c of the front differential 17 in the axial direction of the first rotary member 32. Therefore, the first rotary member 32 is rotated around the rotation axis C1 together with the front differential 17.

The second rotary member 34 is disposed radially outside of the first rotary member 32, and is supported such that it is rotatable around the rotation axis C1 of the front wheel axle 26 as the first rotary member 32. Specifically, the second rotary member 34 is supported by double row contact ball bearings 68 such that it is rotatable in a cantilever state. The ring gear 33 that is engaged with the driven pinion 55 is fixed in a non-rotatable relatively manner at an outer peripheral end on the side close to the front differential 17 in the axial direction of the second rotary member 34.

The first connection/disconnection mechanism 36 is disposed between the first rotary member 32 and the second rotary member 34, and selectively connects or disconnects a power transmission between the first rotary member 32 and the second rotary member 34. The first connection/disconnection mechanism 36 is configured to movable in the rotation axial direction of the front wheel axle 26 such that a first position that indicates a position lower than the rotation axis C1 of the front wheel axle 26 in FIG. 2 for connecting the first rotary member 32 and the second rotary member 34 and a second position that indicates a position upper than the rotation axis C1 of the front wheel axle 26 in FIG. 2 for disconnecting the first rotary member 32 and the second rotary member 34 can be obtained. The first connection/disconnection mechanism 36 is configured to include a movable sleeve 70 that is formed with outer engagement teeth 70a on the outer peripheral portion, and engagement teeth 72 that are formed on an axial end on the side close to the front differential 17 in the axial direction of the second rotary member 34. The movable sleeve 70 is splined with outer teeth 32a that are formed on the first rotary member 32 by its inner peripheral portion, and is provided such that it is non-rotatable relative to the first rotary member 32 and is movable relative to it in the axial direction. Note that, the movable sleeve 70 corresponds to the switching member of the invention.

A state where the outer engagement teeth 70a and the engagement teeth 72 are disengaged is shown on the upper side with respect to the rotation axis C1 of FIG. 2. In this state, since the movable sleeve 70 is moved to the side of the front differential 17 in the axial direction of the front wheel axle 26 and disconnects the first rotary member 32 and the second rotary member 34, the driving force from the engine 10 is not transmitted to the second rotary member 34. Thus, the movable sleeve 70 can be moved to the second position for disconnecting the first rotary member 32 (power input shaft) and the second rotary member 34 (power output shaft) as shown with respect to the upper side of the rotation axis C1 of FIG. 2. On the other hand, a state where the outer engagement teeth 70a are engaged with the engagement teeth 72 is shown on the lower side with respect to the rotation axis C1 of FIG. 2. In this state, since the movable sleeve 70 is moved to the opposite side to the front differential 17 in the axial direction of the front wheel axle 26 and connects the first rotary member 32 and the second rotary member 34, the driving force from the engine 10 is transmitted to the second rotary member 34. That is, the driving force of the engine 10 is transmitted to the propeller shaft 20 (rear wheel side) via the transfer 18. Thus, the movable sleeve 70 can be moved to the first position for connecting the first rotary member 32 (power input shaft) and the second rotary member 34 (power output shaft), as shown on the lower side with respect to the rotation axis C1 of FIG. 2.

Further, a spring 73 is provided between the ball bearing 66 and the movable sleeve 70 in the axial direction and acts on the movable sleeve 70 on the side of the ball bearing 67 in the axial direction (opposite side to the front differential 17). In other words, it acts on the side that the outer engagement teeth 70a are engaged with the engagement teeth 72.

The first thrust force amplification mechanism 56 is provided between the first rotary member 32 and the second rotary member 34 as viewed from the axial direction. The first thrust force amplification mechanism 56 is ball cam, and is configured of a first cam 74 that is rotatable around the rotation axis C1 of the front wheel axle 26, a second cam 76 that is rotatable around the rotation axis C1 of the front wheel axle 26 as the first cam 74 and is configured to be movable in the axial direction relative to the front wheel axle 26, and a ball 78 that is interposed between the first cam 74 and the second cam 76 in the axial direction. Further, the first thrust force amplification mechanism 56 is further provided with a piston 80 that is movable in the axial direction together with the second cam 76 by contacting with the second cam 76, and a spring 82 that is interposed between the piston 80 and the second cam 76 in the axial direction and acts on the second cam 76 to the side of the first cam 74 (the side of the bearing 67) in the axial direction. Note that, the first cam 74 corresponds to the other one of the pair of rotary members of the invention, and the second cam 76 corresponds to the one of the pair of rotary members of the invention.

The first cam 74 has a circular ring shape, and the inner peripheral surface thereof is slidably fitted to the outer peripheral surface of the first rotary member 32. The outer peripheral end of the first cam 74 is splined with inner clutch plates constituting the first control clutch 60 in a non-rotatable relatively manner. The second cam 76 has a circular ring shape, and the inner peripheral portion is splined with the outer peripheral portion of the first rotary member 32 and thus is not rotatable relative to the first rotary member 32 but is movable in the axial direction. A protrusion portion is formed to extend from an end of the second cam 76 in the axial direction to the side of the first connection/disconnection mechanism 36, and an axial end of the protrusion portion contacts the piston 80.

Cam surfaces 74a and 76a of a groove shape are formed on facing surfaces of the first cam 74 and second cam 76 respectively, and the ball 78 is inserted such that it is sandwiched by the pair of cam surfaces 74a and 76a. Moreover, when the first cam 74 and the second cam 76 are rotated relative to each other, since the ball 78 is to expand the cam surfaces 74a and 76a of the first cam 74 and the second cam 76 in the axial direction, the first cam 74 and the second cam 76 are moved away relative to each other in the axial direction. Further, since the end of the second cam 76 on the side of the front differential 17 in the axial direction contacts an end of the piston 80 in the axial direction, for example, if the second cam 76 is moved to the side of the front differential 17 in the axial direction, the piston 80 is also moved to the side of the front differential 17 in the axial direction in conjunction with the second cam 76. The piston 80 is interposed between the second cam 76 and a holder 94 (which will be described later) and the first synchronization mechanism 64, and is rotatable relative to the first rotary member 32 and is movable in the axial direction.

The first control clutch 60 is disposed radially outside of the first thrust force amplification mechanism 56 (first cam 74), and can selectively engages (fully engages) or slidably engages the first cam 74 constituting the first thrust force amplification mechanism 56 with the transfer casing 58 that is the non-rotary member. The first control clutch 60 is configured to include inner clutch plates of a disc shape that are splined with the outer peripheral end of the first cam 74 and thus are not rotatable relative to the first cam 74 but are movable relative to it in the axial direction, outer clutch plates of a disc shape that are stacked alternately on the inner clutch plates and in which their outer peripheral portions are splined with the transfer casing 58 such that they are not rotatable relative to it but are movable relative to it in the axial direction, and an armature 86 in which their outer peripheral portions are splined with the transfer casing 58 such that they are not rotatable relative to it but are movable relative to it in the axial direction as the outer clutch plates. A friction engagement element 84 of the first control clutch 60 is configured of the inner clutch plates and the outer clutch plates.

The first electromagnetic solenoid 62 is disposed at a position at which the friction engagement element 84 and the armature 86 of the first control clutch 60 overlap as viewed from the axial direction. When a current flows through the first electromagnetic solenoid 62, a magnetic flux is generated in the vicinity of the electromagnetic solenoid, and the armature 86 is configured to be attracted to the side of the first electromagnetic solenoid 62 in the axial direction. Therefore, when the current flows through the first electromagnetic solenoid 62, the armature 86 pushes the friction engagement element 84, and the first control clutch 60 is engaged or slidably engaged. As a result, since when the current flows through the first electromagnetic solenoid 62 the first control clutch 60 is engaged or slidably engaged, a rotation suppression torque is applied to the first cam 74 of the first thrust force amplification mechanism 56. Note that, the first electromagnetic solenoid 62 corresponds to the first actuator of the invention.

If the rotation of the first cam 74 of the first thrust force amplification mechanism 56 is stopped or lowered, a relative rotation occurs between the first cam 74 and the second cam 76 that is rotated integrally with the first rotary member 32, and therefore the first cam 74 and the second cam 76 are expanded by the ball 78 in the axial direction. Here, since the movement of the first cam 74 in the axial direction due to contact with the transfer casing 58 via a thrust bearing is restricted, the second cam 76 is moved to the side of the front differential 17 in the axial direction. Further, if the second cam 76 is moved in the axial direction, the piston 80 that contacts the second cam 76, a synchronization ring 88 of the first synchronization mechanism 64 that abuts the piston 80 via a thrust bearing, and the movable sleeve 70 of the first connection/disconnection mechanism 36 that abuts the synchronization ring 88 are also moved to the side of the front differential 17 in the axial direction.

The first synchronization mechanism 64 for synchronizing the rotations of the first rotary member 32 and the second rotary member 34 is provided between the piston 80 and the movable sleeve 70 of the first connection/disconnection mechanism 36 in the axial direction of the front wheel axle 26. That is, the first synchronization mechanism 64 functions as a synchronization device when connecting the first connection/disconnection mechanism 36, and is provided as a portion of the first connection/disconnection mechanism 36. The first synchronization mechanism 64 is configured to include the synchronization ring 88, a friction engagement member 90 that is splined with the movable sleeve 70 such that the friction engagement member 90 is not rotatable relative to it but is movable in the axial direction, and a friction engagement member 92 that is splined with the second rotary member 34 such that the friction engagement member 92 is not rotatable relative to it but is movable relative to it in the axial direction.

The synchronization ring 88 has a circular ring shape and the inner peripheral portion thereof is splined with the first rotary member 32, and thereby the synchronization ring 88 is configured to be not rotatable relative to the first rotary member 32 but movable in the axial direction. The friction engagement member 90 has a conical shape, and the inner peripheral portion thereof is splined with the movable sleeve 70. Further, the conical surface of the outer peripheral side of the friction engagement member 90 is brought into slidable contact with the conical surface formed on the inner peripheral side of the second rotary member 34, and the conical surface of the inner peripheral side is brought into slidable contact with the conical surface of the outer peripheral side of the friction engagement member 92. Further, the outer peripheral surface of the synchronization ring 88 is formed in a conical shape, and the conical surface of the inner peripheral side of the friction engagement member 92 is brought into slidable contact with the conical surface of the outer peripheral side of the synchronization ring 88. Further, a thrust bearing is interposed between the synchronization ring 88 and the piston 80.

In the first synchronization mechanism 64 that is configured as above, if the synchronization ring 88 is pressed against the side of the movable sleeve 70 by the piston 80, a friction force is generated on a sliding contact surface between the synchronization ring 88 and the friction engagement member 92, a sliding contact surface between the friction engagement member 90 and the friction engagement member 92, and a sliding contact surface between the second rotary member 34 and the friction engagement member 90. The first rotary member 32 and the second rotary member 34 are rotated in synchronization by the friction force. If the first rotary member 32 and the second rotary member 34 are rotated in synchronization, outer engagement teeth 70a of the first connection/disconnection mechanism 36 can be engaged with the engagement teeth 72 during traveling.

The first holder 94 that functions as a fixation mechanism (latching mechanism) for maintaining the connection/disconnection state of the first connection/disconnection mechanism 36 is provided between the piston 80 and the first thrust force amplification mechanism 56. The first holder 94 is formed in a circular ring shape, and is fixed on the first rotary member 32 such that the first holder 94 is not rotatable relative to it and is not movable in the axial direction. Further, latching teeth 94a and 94b (see FIG. 3) are formed on the outer peripheral surface of the first holder 94. Note that, the first holder 94 corresponds to the fixation mechanism of the invention.

FIG. 3 is a schematic view illustrating an operation principle of the first holder 94 latching the piston 80, and corresponds to a diagram presenting the second cam 76, the piston 80, and the first holder 94 in a circumferential direction. In addition, in FIG. 3, the vertical direction of the paper sheet corresponds to the axial direction of the rotation axis C1, and the left and right direction of the paper sheet corresponds to the circumferential direction (rotation direction). Further, although not shown, the spring 73 always acts on the piston 80 to the side of the second cam 76 (lower side in the paper sheet) in the axial direction.

The latching teeth 94a and the latching teeth 94b for latching the piston 80 as described above are formed periodically on the outer peripheral surface of the side close to the front differential 17 in the axial direction of the first holder 94. The latching teeth 94a and the latching teeth 94b are formed at different positions in the axial direction. Further, protrusions 80a for latching the latching teeth 94a and 94b are formed periodically on the piston 80. Further, pressing teeth 76a and pressing teeth 76b that contact the protrusions 80a of the piston 80 when the second cam 76 contacts the piston 80 are formed periodically on the axial end of the second cam 76. The pressing teeth 76a and the pressing teeth 76b are formed at different positions in the axial direction. Moreover, since the second cam 76 and the first holder 94 are not rotatable relative to the first rotary member 32, the relative positions of the pressing teeth 76a and 76b of the second cam 76 and the latching teeth 94a and 94b of the first holder 94 are not changed in the circumferential direction (rotation direction).

The piston 80 at position A indicated by a solid line in FIG. 3 shows a state where the protrusions 80a of the piston 80 are latched by the latching teeth 94a of the first holder 94. In this state, a state where the piston 80 is moved to the side of the second cam 76 (the side of the ball bearing 67) in the axial direction is shown. This corresponds to the state of the lower side with respect to the rotation axis C1 in FIG. 2, that is a state where the outer engagement teeth 70a are engaged with the engagement teeth 72 in the first connection/disconnection mechanism 36. That is a state where the first rotary member 32 and the second rotary member 34 are connected by the first connection/disconnection mechanism 36.

If the second cam 76 reciprocates once in the axial direction by the first thrust force amplification mechanism 56 from the this state, the protrusions 80a are lifted by the pressing teeth 76a. In this case, the piston 80 is moved in the axial direction to resist the action force of the spring 73, the protrusions 80a is moved beyond the latching teeth 94a and to the side of the latching teeth 94b and slide on the slopes of the latching teeth 94b, such that it is latched at position B indicated by a dashed line. In this state, the piston 80 is moved to the side of the front differential 17 in the axial direction, that is the stated of the upper side with respect to the rotation axis C1 in FIG. 2. That is, the outer engagement teeth 70a are disengaged from the engagement teeth 72 in the first connection/disconnection mechanism 36, that is a state where the first rotary member 32 and the second rotary member 34 are disconnected by the first connection/disconnection mechanism 36.

In addition, if the second cam 76 reciprocates once from the state where the piston 80 is latched at position B, the protrusions 80a are lifted by the pressing teeth 76b of the second cam 76. In this case, the piston 80 is moved in the axial direction to resist the action force of the spring 73, the protrusions 80a is moved beyond the latching teeth 94b and to the side of the latching teeth 94a and slide on the slopes of the latching teeth 94a, such that the piston 80 is latched at position A as indicated by a dashed line. Thus, each time the second cam 76 reciprocates once, the piston 80 is latched at one of position A at which the first connection/disconnection mechanism 36 is connected by the first holder 94 and position B at which the first connection/disconnection mechanism 36 is disconnected by the first holder 94. Further, in a state where the second cam 76 does not operate, the piston 80 is maintained mechanically at one of position A and position B by the first holder 94.

Figure 4A:
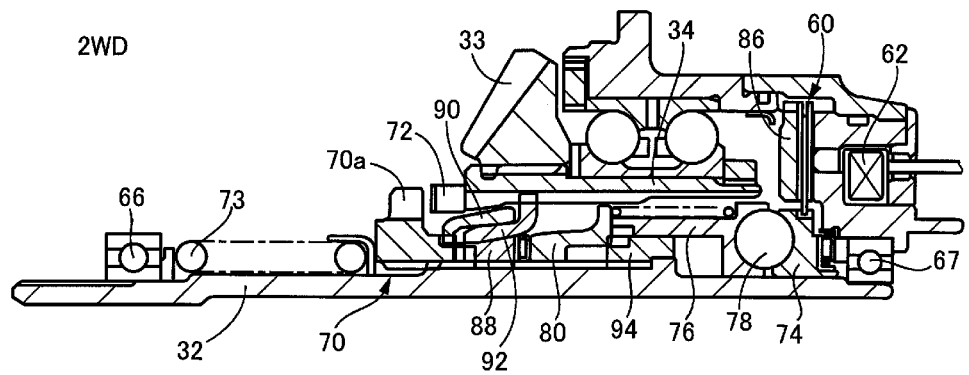
FIG. 4A is a portion of the transfer of FIG. 2 showing a two-wheel drive (2WD) operating state of the transfer where a first connection/disconnection mechanism is disconnected.
Figure 4B:
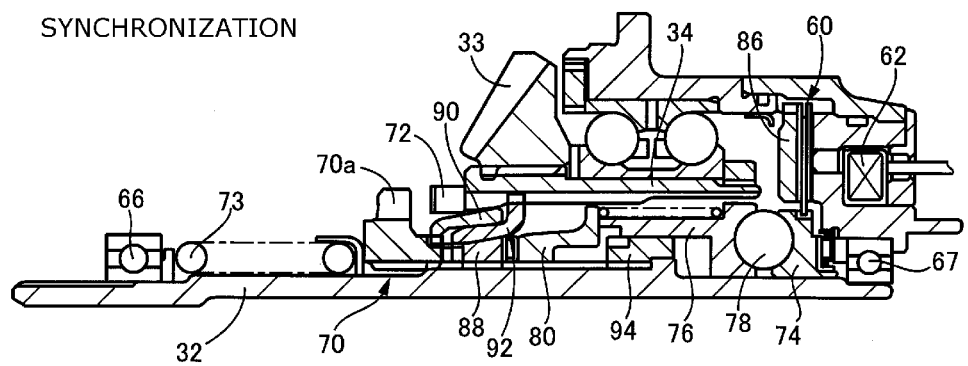
FIG. 4B is a portion of the transfer of FIG. 2 showing a synchronization process of the first synchronization mechanism during a transition period for switching from the two-wheel drive (2WD) to the four-wheel drive (4WD)
Figure 4C:
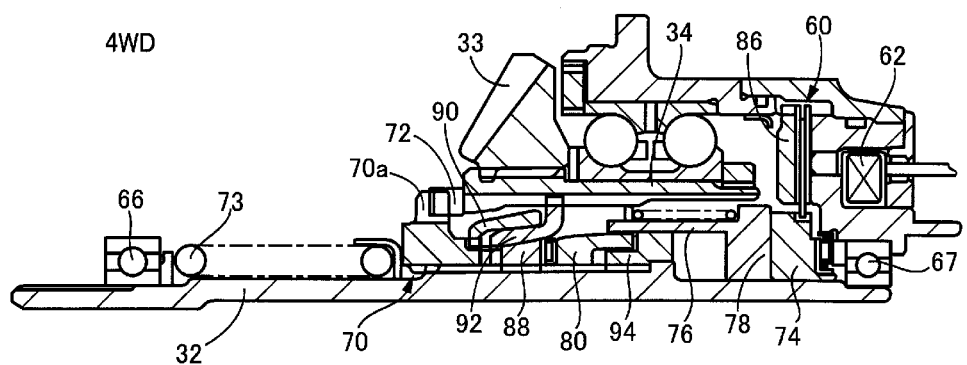
FIG. 4C is a portion of the transfer of FIG. 2 showing a state of switching to the four-wheel drive (4WD) where a first connection/disconnection mechanism is connected.

The operation of the transfer 18 that is configured as described above will be described with reference to FIG. 4A to FIG. 5. FIG. 4A, FIG. 4B and FIG. 4C are a portion of the transfer 18 of FIG. 2 (the portion related to the connection/disconnection of the first connection/disconnection mechanism 36), and show an operating state of the transfer 18 in time series when it is switched from a two-wheel drive (2WD) to a four-wheel drive (4WD). FIG. 4A shows a two-wheel drive state that is a state where the first connection/disconnection mechanism 36 is disconnected, FIG. 4B shows a synchronization process (rotation synchronization process) of the first synchronization mechanism 64 during a transition period for switching from the two-wheel drive to the four-wheel drive, and FIG. 4C shows a state of switching to the four-wheel drive that is a state where the first connection/disconnection mechanism 36 is connected. FIG. 5 shows a process that the transfer 18 is switched from the two-wheel drive to the four-wheel drive in a flowchart.

In the two-wheel drive as shown in FIG. 4A, the piston 80 is maintained at position B of FIG. 3. That is a state where the protrusions 80a of the piston 80 are latched by the latching teeth 94b of the first holder 94. At this time, the movable sleeve 70 is moved to the side of the front differential 17 by the piston 80 via the synchronization ring 88 and the thrust bearing, and is maintained at the position (second position) as shown in FIG. 4A. Therefore, the outer engagement teeth 70a of the movable sleeve 70 and the engagement teeth 72 are disengaged, and the first rotary member 32 and the second rotary member 34 are disconnected.

The two-wheel drive of FIG. 4A corresponds to the disconnection state of step S1 of FIG. 5. The operation will be explained below according to the flowchart of FIG. 5. If the first electromagnetic solenoid 62 is energized in step S2 of FIG. 5, the armature 86 is attracted to the side of the first electromagnetic solenoid 62 (armature attraction) in step S3, and a clutch torque is generated in the first control clutch 60 (step S4). Then, if the first control clutch 60 is engaged or half engaged, a rotation suppression torque is applied to the first cam 74, and a relative rotation occurs between the first cam 74 and the second cam 76 (step S5). Accordingly, the ball 78 expands the first cam 74 and the second cam 76 toward a deviation direction in the axial direction, and thus the second cam 76 is moved to the side of the front differential 17 in the axial direction (step S6). Moreover, the second cam 76 from the axial movement, the piston 80 is pressed by the second cam 76 in the axial direction, the synchronization ring 88 are moved in the axial direction to the side of the front differential 17 also movable sleeve 70 (step S7).

Further, since the synchronization ring 88 is moved in the axial direction, a friction force is generated between the outer peripheral surface of the synchronization ring 88 and the inner peripheral surface of the friction engagement member 92, between the outer peripheral surface of the friction engagement member 92 and the inner peripheral surface of the friction engagement member 90, and between the outer peripheral surface of the friction engagement member 90 and the inner peripheral surface of the second rotary member 34, and the rotations of the first rotary member 32 and the second rotary member 34 starts to be synchronized (in synchronization) by the friction force (step S8). This state corresponds to FIG. 4B. In FIG. 4B, it is a state where the second cam 76 is further moved to the side of the front differential 17 in the axial direction as compared with the state shown in FIG. 4A, and the piston 80 that is pressed by the second cam 76, the synchronization ring 88, and the movable sleeve 70 are also further moved to the side of the front differential 17. Moreover, since the friction force is generated by the synchronization ring 88 and the friction engagement members 90 and 92 being pressed by each other, the first rotary member 32 and the second rotary member 34 are rotated in synchronization.

Further, if a relative rotating speed between the first rotary member 32 and the second rotary member 34 is equal to or less than an allowable value (step S9), it is determined that the first connection/disconnection mechanism 36 can be connected, and the energization of the first electromagnetic solenoid 62 is shut off (step S10). In addition, the relative rotating speed of the first rotary member 32 and the second rotary member 34 is calculated using a difference between a rotating speed N1 that is detected by a first rotating speed sensor 122 (see FIG. 7) for detecting the rotating speed N1 of the first rotary member 32 and a rotating speed N2 that is detected by a second rotating speed sensor 124 (see FIG. 7) for detecting a rotating speed N2 of the second rotary member 34.

If the energization of the first electromagnetic solenoid 62 is shut off, the pressing force of the second cam 76 by the first thrust force amplification mechanism 56 becomes zero, and thus the movable sleeve 70, the synchronization ring 88, the piston 80, and the second cam 76 are pushed back to the side of the ball bearing 67 in the axial direction by the action force of the spring 73 (step S11). At this time, since the first rotary member 32 and the second rotary member 34 are rotated in synchronization, when the movable sleeve 70 is pushed back, the outer engagement teeth 70a of the movable sleeve 70 and the engagement teeth 72 are engaged (step S12). Further, the piston 80 is latched at position A in FIG. 3 by the first holder 94 (step S13). In addition, since the spring 82 acts on the second cam 76 in the axial direction, the second cam 76 is pushed back to the side of the ball bearing 67 (step S14).

The state of step S11 to step S14 corresponds to FIG. 4C. In FIG. 4C, since the movable sleeve 70, the synchronization ring 88, the piston 80, and the second cam 76 are pushed back to the side of the ball bearing 67 in the axial direction by the action force of the spring 73, the piston 80 becomes the state of position A in FIG. 3. In other words, the protrusions 80a of the piston 80 are latched by the latching teeth 94a of the first holder 94. Thus, the piston 80 is pushed back to position A in FIG. 3 by the spring 73, and thus the movable sleeve 70 is also pushed back to a position (first position) at which the outer engagement teeth 70a and the engagement teeth 72 are engaged. Accordingly, the first rotary member 32 and the second rotary member 34 are connected, and a portion of the driving force of the engine 10 is transmitted to the rear wheel side via the transfer 18. Further, even if the energization of the first electromagnetic solenoid 62 is shut off, the four-wheel drive state is maintained mechanically by the first holder 94.

Further, if the first electromagnetic solenoid 62 is energized again from the four-wheel drive state, the piston 80, the synchronization ring 88, and the movable sleeve 70 are moved in the axial direction as the second cam 76 is moved in the axial direction, which is the same as the above action. If the protrusions 80a of the piston 80 are lifted by the pressing teeth 76a of the second cam 76 and moved from the latching teeth 94a to the side of the latching teeth 94b, the energization of the first electromagnetic solenoid 62 is shut off, and the protrusions 80a of the piston 80 are pushed back by the spring 73 and latched by the latching teeth 94b (position B in FIG. 3). In this case, it is the state in FIG. 4A, the outer engagement teeth 70a and the engagement teeth 72 are disengaged in the first connection/disconnection mechanism 36, and the first rotary member 32 and the second rotary member 34 are disconnected (two-wheel drive). Thus, if the second cam 76 reciprocates two times, it returns to the original state.

By being configured as described above, even if the torque that is generated in the first control clutch 60 is low, the torque can be amplified by the ball cam constituting the first thrust force amplification mechanism 56 to obtain a large thrust force at the piston 80. Further, the first thrust force amplification mechanism 56 operates by using the relative rotation between the first cam 74 and the second cam 76. However, since the second cam 76 is connected to and rotated integrally with the first rotary member 32 and thus is rotated at a speed proportional to the vehicle speed V, when the rotation of the first cam 74 is stopped or lowered by the first control clutch 60, the relative rotation between the first cam 74 and the second cam 76 is large, and thus the first thrust force amplification mechanism 56 is actuated quickly. That is, the responsivity of the first connection/disconnection mechanism 36 is high.

Figure 6:
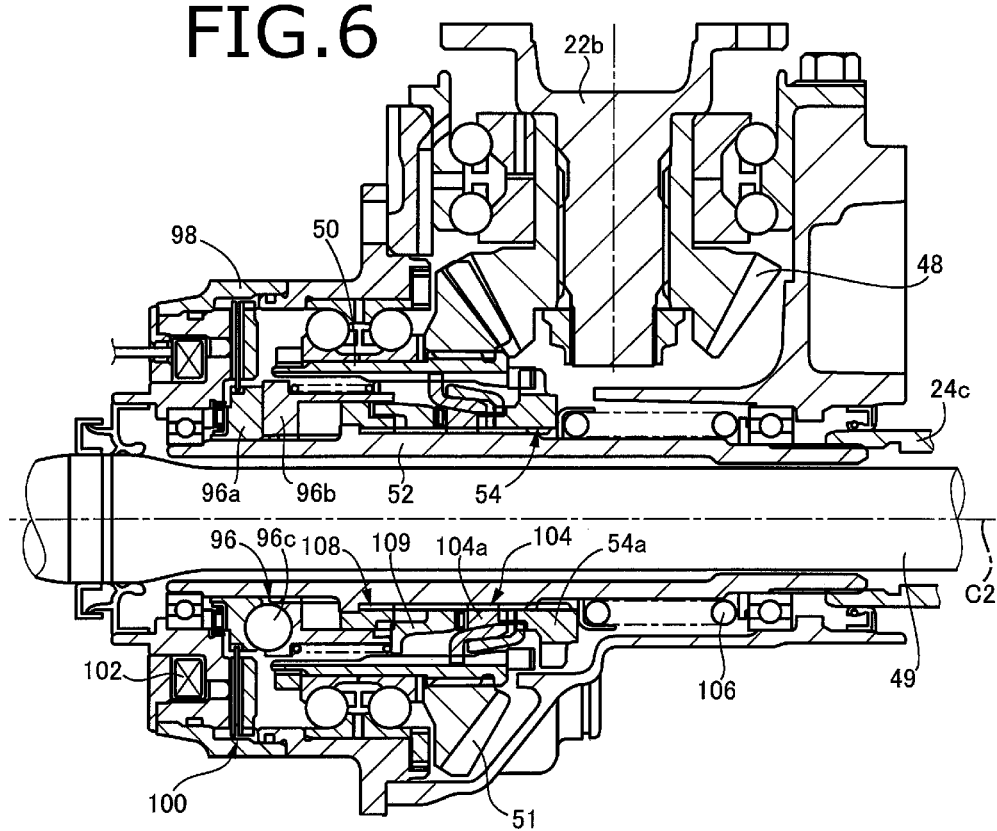
FIG. 6 is a sectional view showing a structure around a second connection/disconnection mechanism that is provided between a coupling and a rear differential of FIG. 1.

In the four-wheel drive apparatus 8 of this embodiment, the second connection/disconnection mechanism 54 that is provided on the rear wheel side is configured similarly to the first connection/disconnection mechanism 36 described above. FIG. 6 is a sectional view showing a structure around the second connection/disconnection mechanism 54 that is provided between the coupling 22 and the rear differential 24. As shown in FIG. 6, the following is provided between the drive pinion 48 and the rear differential 24: the third rotary member 50 (the power input shaft of the invention) that is provided with the ring gear 51 which is engaged with the drive pinion 48 and that is rotatable around the rotation axis C2 of the rear wheel axle 49, the fourth rotary member 52 (the power output shaft of the invention) that is connected to the casing 24c of the rear differential 24 and is rotatable around the rotation axis C2 of the rear wheel axle 49 as the third rotary member 50, the second connection/disconnection mechanism 54 having a dog clutch (engagement clutch) that selectively connects or disconnects the third rotary member 50 and the fourth rotary member, a second thrust force amplification mechanism 96 that generates a thrust force for switching the second connection/disconnection mechanism 54, a second control clutch 100 that is provided between a first cam 96a of the second thrust force amplification mechanism 96 and a casing 98 that is a non-rotary member, a second electromagnetic solenoid 102 that is used to adjust (control) an engagement force of the second control clutch 100; a second synchronization mechanism 104 that functions as a rotation synchronization device when connecting the third rotary member 50 and the fourth rotary member by the second connection/disconnection mechanism 54, a spring 106 that acts on a pair of engagement teeth constituting the second connection/disconnection mechanism 54 to the engagement side, and a second holder 108 that maintains the connection/disconnection state of the second connection/disconnection mechanism 54. Note that, the second electromagnetic solenoid 102 corresponds to the second actuator of the invention, the second synchronization mechanism 104 corresponds to the synchronization mechanism of the invention, and the second holder 108 corresponds to the fixation mechanism of the invention.

Since essentially the same structure as that of the transfer 18 on the front wheel side is provided on the rear wheel side, the outline thereof will be described. In FIG. 6, the third rotary member 50 is configured to be rotatable around the rotation axis C2 of the rear wheel axle 49, and the fourth rotary member 52 is also configured to be rotatable around the rotation axis C2 of the rear wheel axle 49. Note that, the third rotary member 50 corresponds to the power input shaft of the invention, and the fourth rotary member 52 corresponds to the power output shaft and the rotary member whose rotating speed is increased in proportion to the vehicle speed of the invention.

Further, the second connection/disconnection mechanism 54 has a movable sleeve 54*a* that is provided with engagement teeth on the outer peripheral portion thereof and is configured to be movable in the axial direction of the rotation of the rear wheel axle 49 in order to obtain a first position at which the third rotary member 50 and the fourth rotary member that are rotatable around the rotation axis C2 of the rear wheel axle 49 are connected and which indicates the upper side with respect to the rotation axis C2 in FIG. 6 and a second position at which the third rotary member 50 and the fourth rotary member are disconnected and which indicates the lower side with respect to the rotation axis C2 in FIG. 6. The inner peripheral portion of the movable sleeve 54*a* is splined with the fourth rotary member 52 such that the movable sleeve 54*a* is not rotatable relative to it, and the outer peripheral portion of the movable sleeve 54*a* is formed with the above engagement teeth that can be engaged to engagement teeth that are formed on the third rotary member 50. This pair of engagement teeth also constitutes the second connection/disconnection mechanism 54. Note that, the movable sleeve 54*a* corresponds to the switching member of the invention.

Further, the second thrust force amplification mechanism 96 is a ball cam that is configured of a pair of a first cam 96*a* and a second cam 96*b* which are rotatable around the rotation axis C2 of the rear wheel axle 49 and a ball 96*c* which is interposed between the first cam 96*a* and the second cam 96*b*. If the first cam 96*a* and the second cam 96*b* are configured to be rotated relative to each other, the ball 96*c* is rotated and these members 96*a* and 96*b* are axially separated. Further, since the movement of the first cam 96*a* in the axial direction due to contact with the casing 98 via a thrust bearing is restricted, if the first cam 96*a* and the second cam 96*b* are separated, the second cam 96*b* is moved in the axial direction, and a second piston 109, a synchronization ring 104*a* of the second synchronization mechanism 104 and the movable sleeve 54*a* are also moved to the side of the rear differential 24 in the axial direction of the rear wheel axle 49 in conjunction with the second cam 96*b*. Note that, the first cam 96*a* corresponds to the other one of the pair of rotary members of the invention, and the second cam 96*b* corresponds to the one of the pair of rotary members of the invention.

The second control clutch 100 is configured to attach a rotation suppression torque to the first cam 96*a* by the second electromagnetic solenoid 102. Further, the second cam 96*b* constituting the second thrust force amplification mechanism 96 is connected to the fourth rotary member 52 whose rotating speed is increased in proportion to the vehicle speed V in a non-rotatable relatively manner.

As described above, when the rear wheel side (a power transmission path between the drive pinion 48 and the rear differential 24) is configured, its operation is essentially the same as that of the transfer 18 described above. For example, if the second electromagnetic solenoid 102 is energized during traveling when the second connection/disconnection mechanism 54 is disconnected, a torque is generated in the second control clutch 100, and the rotation suppression torque is applied to the first cam 96*a*. Therefore, since a relative rotation between the first cam 96*a* and the second cam 96*b* constituting the second thrust force amplification mechanism 96 occurs, the first cam 96*a* and the second cam 96*b* are axially separated such that the second cam 96*b* is moved in the axial direction. Then, if the synchronization ring 104*a* of the second synchronization mechanism 104 and the movable sleeve 54*a* of the second connection/disconnection mechanism 54 are moved in the axial direction by the second cam 96*b* of the second thrust force amplification mechanism 96 to resist the action force of the spring 106, the rotations of the third rotary member 50 and the fourth rotary member 52 are synchronized by the second synchronization mechanism 104. Further, when the energization of the second electromagnetic solenoid 102 is shut off, the movable sleeve 54*a* is pushed back to connect the second connection/disconnection mechanism 54 by the action force of the spring 106. In this case, the connection/disconnection state of the second connection/disconnection mechanism 54 is maintained by the second holder 108. Thus, on the rear wheel side, the connection/disconnection state of the second connection/disconnection mechanism 54 is switched based on the same operation principle as that of the front wheel side. Here, since the second cam 96*b* constituting the second thrust force amplification mechanism 96 is connected to and rotated integrally with the fourth rotary member 52 and thus is rotated at a speed that is proportional to the vehicle speed V, the relative rotation between the first cam 96*a* and the second cam 96*b* is large when the rotation of the first cam 96*a* is stopped or lowered and thus the second thrust force amplification mechanism 96 is actuated quickly. That is, the responsivity of the second connection/disconnection mechanism 54 is high.

In the four-wheel drive apparatus 8 of this embodiment, since the first connection/disconnection mechanism 36 is provided on the front wheel side and the second connection/disconnection mechanism 54 is provided on the rear wheel side, by disconnecting the first connection/disconnection mechanism 36 and the second connection/disconnection mechanism 54 during two-wheel drive traveling, for example, it is possible to disconnect the power transmission to the propeller shaft 20 and prevent a decrease in fuel efficiency due to the traction of the propeller shaft 20 and the like. Further, in a case where slide or the like occurs during two-wheel drive traveling, for example, it is desired to connect the first connection/disconnection mechanism 36 and the second connection/disconnection mechanism 54 quickly to switch to the four-wheel drive. In switching of the drive state, responsivities of both the first connection/disconnection mechanism 36 and the second connection/disconnection mechanism 54 are sought. That is, if either one of the responsivities of the first connection/disconnection mechanism 36 and the second connection/disconnection mechanism 54 is degraded, the switching responsivity of the drive state of the four-wheel drive apparatus 8 is degraded. In contrast, since the first connection/disconnection mechanism 36 and the second connection/disconnection mechanism 54 for switching the drive state of the four-wheel drive apparatus 8 both are configured as described above such that the responsivity is high, the switching responsivity of the drive state of the four-wheel drive apparatus 8 is high.

Figure 7:
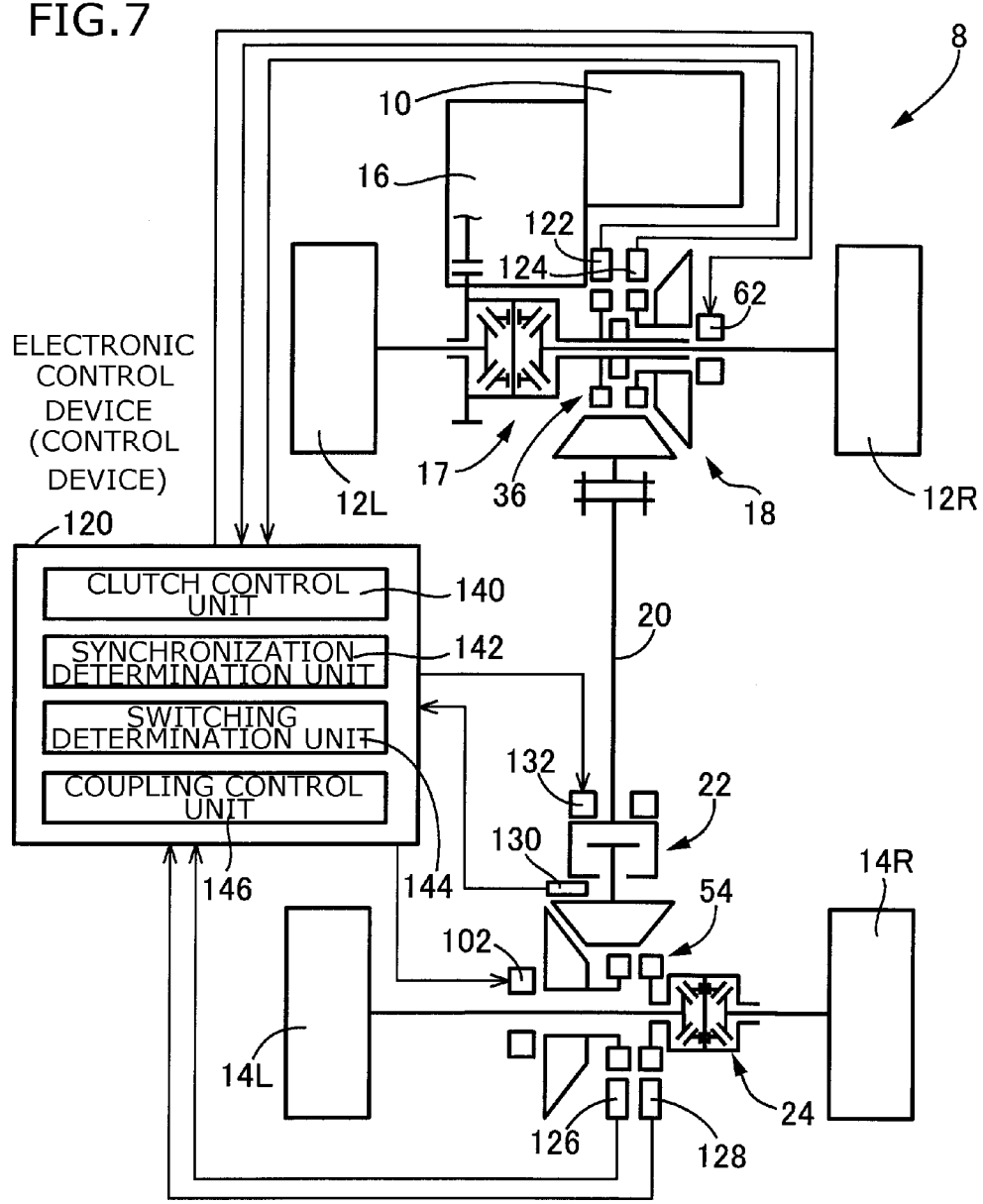
FIG. 7 is a functional block diagram illustrating an input/output system and a control function of an electronic control device for controlling a drive state of the four-wheel drive apparatus of FIG. 1.

Next, the switching of the drive state of the four-wheel drive apparatus 8 that is configured as described above will be described. FIG. 7 is a functional block diagram illustrating an input/output system and a control function of an electronic control device 120 for controlling the drive state (switching the connection/disconnection states of the first connection/disconnection mechanism 36 and the second connection/disconnection mechanism 54) of the four-wheel drive apparatus 8.

A signal indicating the rotating speed N1 of the first rotary member 32 that is detected by the first rotating speed sensor 122, a signal indicating the rotating speed N2 of the second rotary member 34 that is detected by the second rotating speed sensor 124, a signal indicating a rotating speed N3 of the third rotary member 50 that is detected by a third rotating speed sensor 126, a signal indicating a rotating speed N4 of the fourth rotary member 52 that is detected by a fourth rotating speed sensor 128, a signal indicating a rotating speed N5 of the downstream side of the coupling 22 that is detected by a fifth rotating speed sensor 130 and the like are input into the electronic control device 120. Further, a drive signal for controlling the first electromagnetic solenoid 62 of the first control clutch 60, a drive signal for controlling the second electromagnetic solenoid 102 of the second control clutch 100, a drive signal for controlling a third electromagnetic solenoid 132 of the control coupling 22 and the like are output from the electronic control device 120.

The electronic control device 120 functionally includes a clutch control unit 140, a synchronization determination unit 142, a switching determination unit 144 and a coupling control unit 146.

When receiving an instruction for switching the drive state of the four-wheel drive apparatus 8, the clutch control unit 140 energizes the first electromagnetic solenoid 62 and the second electromagnetic solenoid 102 and generates torques in the first control clutch 60 and the second control clutch 100 to engage the first control clutch 60 and the second control clutch 100.

If the first electromagnetic solenoid 62 is energized, the synchronization determination unit 142 determines whether the relative rotating speed that is a rotating speed difference N12 (N2−N1) between the first rotary member 32 and the second rotary member 34 is less than a predetermined allowable value α. That is, it is determined whether the rotations of the first rotary member 32 and the second rotary member 34 are synchronized by the first synchronization mechanism 64. If the second electromagnetic solenoid 102 is energized, the synchronization determination unit 142 determines whether the relative rotating speed that is a rotating speed difference N34 (N4−N3) between the third rotary member 50 and the fourth rotary member 52 is less than a predetermined allowable value β. That is, it is determined whether the rotations of the third rotary member 50 and the fourth rotary member 52 are synchronized by the second synchronization mechanism 104. In addition, the allowable values α, β are set to the rotating speed differences such that when the first connection/disconnection mechanism 36 and the second connection/disconnection mechanism 54 are connected, the respective engagement teeth can be engaged.

If the synchronization determination unit 142 determines that the rotating speed difference N12 between the first rotary member 32 and the second rotary member 34 is less than the allowable value α and the rotating speed difference N34 between the third rotary member 50 and the fourth rotary member 52 is less than the allowable value β, the clutch control unit 140 outputs an instruction to shut off the energizations of the first electromagnetic solenoid 62 and the second electromagnetic solenoid 102. By shutting off the energizations of the first electromagnetic solenoid 62 and the second electromagnetic solenoid 102, the pressing by the first thrust force amplification mechanism 56 and the second thrust force amplification mechanism 96 is released, and the connection/disconnection states of the first connection/disconnection mechanism 36 and the second connection/disconnection mechanism 54 are switched. In other words, the latching position of the holder for latching the piston is switched.

After the energizations of the first electromagnetic solenoid 62 and the second electromagnetic solenoid 102 are shut off, the switching determination unit 144 determines whether it is switched to the four-wheel drive or the two-wheel drive. For example, if it is detected that the movable sleeve 70 constituting the first connection/disconnection mechanism 36 is located at a predetermined engagement position at which the engagement teeth of the first connection/disconnection mechanism 36 are engaged and the movable sleeve 54a constituting the second connection/disconnection mechanism 54 is located at a predetermined engagement position at which the engagement teeth of the second connection/disconnection mechanism 54 are engaged, the switching determination unit 144 determines that the switching to the four-wheel drive is completed. Further, if it is detected that the movable sleeve 70 of the first connection/disconnection mechanism 36 is located at a predetermined disengagement position at which the engagement teeth of the first connection/disconnection mechanism 36 are disengaged and the movable sleeve 54a of the second connection/disconnection mechanism 54 is located at a predetermined disengagement position at which the engagement teeth of the second connection/disconnection mechanism 54 are disengaged, the switching determination unit 144 determines that the switching to the two-wheel drive is completed. Further, the positions of the movable sleeve 70 and the movable sleeve 54a are detected for example by position sensors (not shown) for detecting the positions of these movable sleeves.

The coupling control unit 146 controls a current of the third electromagnetic solenoid 132 for controlling a torque capacity of the coupling 22, thereby to control the torque capacity of the coupling 22 as appropriate. For example, when switching from the two-wheel drive to the four-wheel drive during traveling, the coupling control unit 146 controls the torque capacity of the coupling 22 to zero until the first rotary member 32 and the second rotary member 34 are synchronized and the third rotary member 50 the fourth rotary member 52 are synchronized. Thereafter, the coupling control unit 146 starts to increase the torque capacity of the coupling 22 at the same time or substantially the same time when these synchronizations are completed and the energizations of the first electromagnetic solenoid 62 and the second electromagnetic solenoid 102 are shut off. Further, if it is determined that the switching to the four-wheel drive is completed, the coupling control unit 146 controls the torque capacity of the coupling 22 to a capacity corresponding to the traveling state of the vehicle by controlling the third electromagnetic solenoid 132. Moreover, when switching from the four-wheel drive to the two-wheel drive during traveling, the coupling control unit 146 starts to decrease the torque capacity of the coupling 22 by controlling the third electromagnetic solenoid 132 at the same time or substantially the same time when the first electromagnetic solenoid 62 and the second electromagnetic solenoid 102 are actuated.

Figure 8:
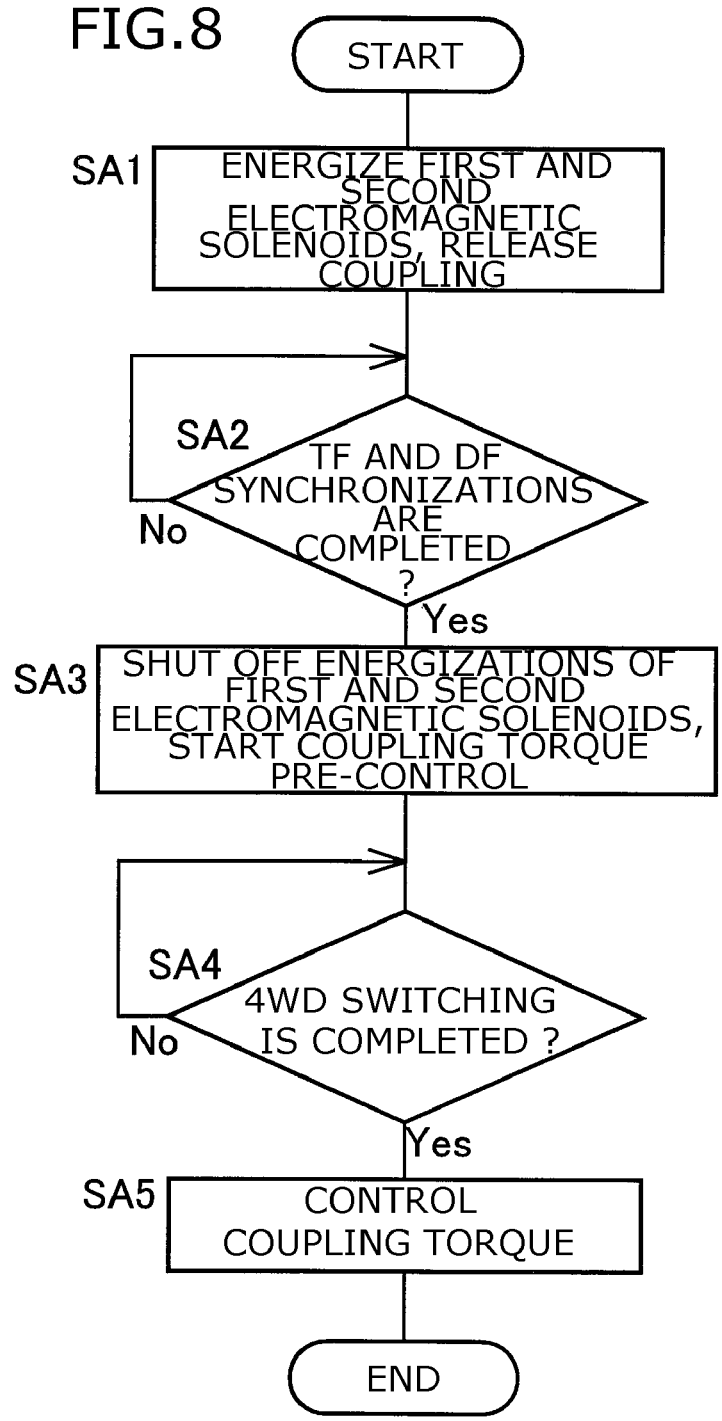
FIG. 8 is a main portion of a control operation of the electronic control device in FIG. 7, specifically, is a flowchart illustrating the control operation of switching from the two-wheel drive to the four-wheel drive during traveling.

FIG. 8 is a main portion of a control operation of the electronic control device 120, and specifically, is a flowchart illustrating a control operation of switching from the two-wheel drive to the four-wheel drive during traveling. This flowchart is repeatedly executed with an extremely short cycle time of about several msec or several ten msec, for example.

When receiving an instruction to switch from the two-wheel drive to the four-wheel drive during traveling, in step SA1 (hereinafter, "step" is omitted) corresponding to the clutch control unit 140 and the coupling control unit 146, the first electromagnetic solenoid 62 and the second electromagnetic solenoid 102 starts to be energized, and the coupling 22 is controlled such that the torque capacity is zero, that is a release state. Further, in the two-wheel drive traveling, since the torque capacity of the coupling 22 is typically zero, the control is performed so that the state is maintained.

In SA2 corresponding to the synchronization determination unit 142, it is determined whether the rotations of the first rotary member 32 and the second rotary member 34 are synchronized (TF synchronization) by the first synchronization mechanism 64, and whether the rotations of the third rotary member 50 and the fourth rotary member 52 are synchronized (DF synchronization) by the second synchronization mechanism 104. The same determination is repeatedly executed until both are rotated in synchronization, and if both are rotated in synchronization, SA2 is positive and proceeds to SA3. In SA3 corresponding to the clutch control unit 140 and the coupling control unit 146, the energizations of the first electromagnetic solenoid 62 and the second electromagnetic solenoid 102 are shut off. In addition, at the same time or substantially the same time, the torque capacity of the coupling 22 starts to be increased. If the energizations of the first electromagnetic solenoid 62 and the second electromagnetic solenoid 102 are shut off, since the pressing by the first thrust force amplification mechanism 56 and the second thrust force amplification mechanism 96 is eliminated, each of the movable sleeves is pushed back by the action forces of the springs 73 and 106, and thus the first connection/disconnection mechanism 36 and the second connection/disconnection mechanism 54 are connected. In this case, the first connection/disconnection mechanism 36 and the second connection/disconnection mechanism 54 are reliably connected as both the first synchronization mechanism 64 and the second synchronization mechanism 104 are in a state of being rotated in synchronization.

In SA4 corresponding to the switching determination unit 144, it is determined whether the switching to the four-wheel drive (4WD) is completed. For example, it is determined that the switching to the four-wheel drive is completed based on signals from the position sensors for detecting the positions of the movable sleeves of the connection/disconnection mechanisms, a signal of a 4WD switch that is output once the connection/disconnection mechanisms are connected and the like. SA4 are repeatedly executed until the switching to the four-wheel drive is completed. If the switching to the four-wheel drive is completed and SA4 is positive, in SA5 corresponding to the coupling control unit 146, the torque capacity of the coupling 22 is controlled to a value corresponding to the traveling state of the vehicle.

The flowchart of FIG. 8 is a flowchart of switching from the two-wheel drive to the four-wheel drive, that is, when the first connection/disconnection mechanism 36 and the second connection/disconnection mechanism 54 are connected. However, when switching from the four-wheel drive to the two-wheel drive, since the rotations of synchronization mechanisms are not required to be synchronized, the torque capacity of the coupling 22 starts to be decreased at the same time or substantially the same time when the first electromagnetic solenoid 62 and the second electromagnetic solenoid 102 are energized.

As described above, according to this embodiment, if the rotations of the first cams 74 and 96a of the first thrust force amplification mechanism 56 and the second thrust force amplification mechanism 96 are stopped or lowered by energizing the first electromagnetic solenoid 62 and the second electromagnetic solenoid 102, the second cams 76 and 96b are rotated at the rotating speeds that are proportional to the vehicle speed V, and thus the relative rotations between the first cams 74 and 96a and the second cams 76 and 96b increase. Therefore, the first thrust force amplification mechanism 56 and the second thrust force amplification mechanism 96 can be actuated quickly, thereby to switch the connection/disconnection states of the first connection/disconnection mechanism 36 and the second connection/disconnection mechanism 54 quickly. Thus, since connection/disconnection states of the first connection/disconnection mechanism 36 and the second connection/disconnection mechanism 54 are switched quickly, the connection/disconnection mechanism with a low responsivity may not be affected when switching the drive state of the four-wheel drive apparatus 8 and the decrease of the responsivity is inhibited. Further, since the first synchronization mechanism 64 and the second synchronization mechanism 104 are provided in the first connection/disconnection mechanism 36 and the second connection/disconnection mechanism 54 respectively, the rotations of the first connection/disconnection mechanism 36 and the second connection/disconnection mechanism 54 can be synchronized quickly by the synchronization mechanisms 64 and 104 and the first connection/disconnection mechanism 36 and the second connection/disconnection mechanism 54 can be connected.

Further, according to this embodiment, since the first thrust force amplification mechanism 56 and the second thrust force amplification mechanism 96 both are ball cams that are configured of the first cams and the second cams as well as the balls interposed between the first cams and the second cams, if the relative rotations occur between the first cams and the second cams, the ball cams are actuated to expand the first cams and the second cams in the axial direction, and the torques of the first control clutch 60 and the second control clutch 100 are amplified and output by the ball cams.

Further, according to this embodiment, by energizing the first electromagnetic solenoid 62 and the second electromagnetic solenoid 102, it is possible to switch the engagement state of the first control clutch 60 and the second control clutch 100.

Further, according to this embodiment, since the holders 94 and 108 are further provided for maintaining the connection/disconnection states of the first connection/disconnection mechanism 36 and the second connection/disconnection mechanism 54, even if the first electromagnetic solenoid 62 and the second electromagnetic solenoid 102 are not energized, the connection/disconnection states of the first connection/disconnection mechanism 36 and the second connection/disconnection mechanism 54 can be maintained by the holders 94 and 108, and the energy for maintaining the connection/disconnection states of the first connection/disconnection mechanism 36 and the second connection/disconnection mechanism 54 can be eliminated.

Further, according to this embodiment, in the case where the first connection/disconnection mechanism 36 and the second connection/disconnection mechanism 54 both are provided with the synchronization mechanisms 64 and 104, they can be connected while being rotated individually in synchronization in the first connection/disconnection mechanism 36 and the second connection/disconnection mechanism 54. Therefore, the first electromagnetic solenoid 62 and the second electromagnetic solenoid 102 can be actuated at the same time or substantially the same time to connect the first connection/disconnection mechanism 36 and the second connection/disconnection mechanism 54 quickly. In this case, the load when being rotated in synchronization can be shared among the synchronization mechanisms 64 and 104 by releasing the coupling.

Next, another embodiment of the invention will be described. Note that, the parts common to the previous embodiment are denoted by the same reference numerals and the description thereof will be omitted below.

The above four-wheel drive apparatus 8 is provided with the synchronization mechanisms in both the first connection/disconnection mechanism 36 and the second connection/disconnection mechanism 54. However, even if the synchronization mechanism is provided in only one of the first connection/disconnection mechanism 36 and the second connection/disconnection mechanism 54, the first connection/disconnection mechanism 36 and the second connection/disconnection mechanism 54 can be switched quickly during traveling. Hereinafter, switching in a case where the synchronization mechanism (first synchronization mechanism 64) is provided only in the first connection/disconnection mechanism 36 will be described with reference to a flowchart of FIG. 9 as an example.

Figure 9:
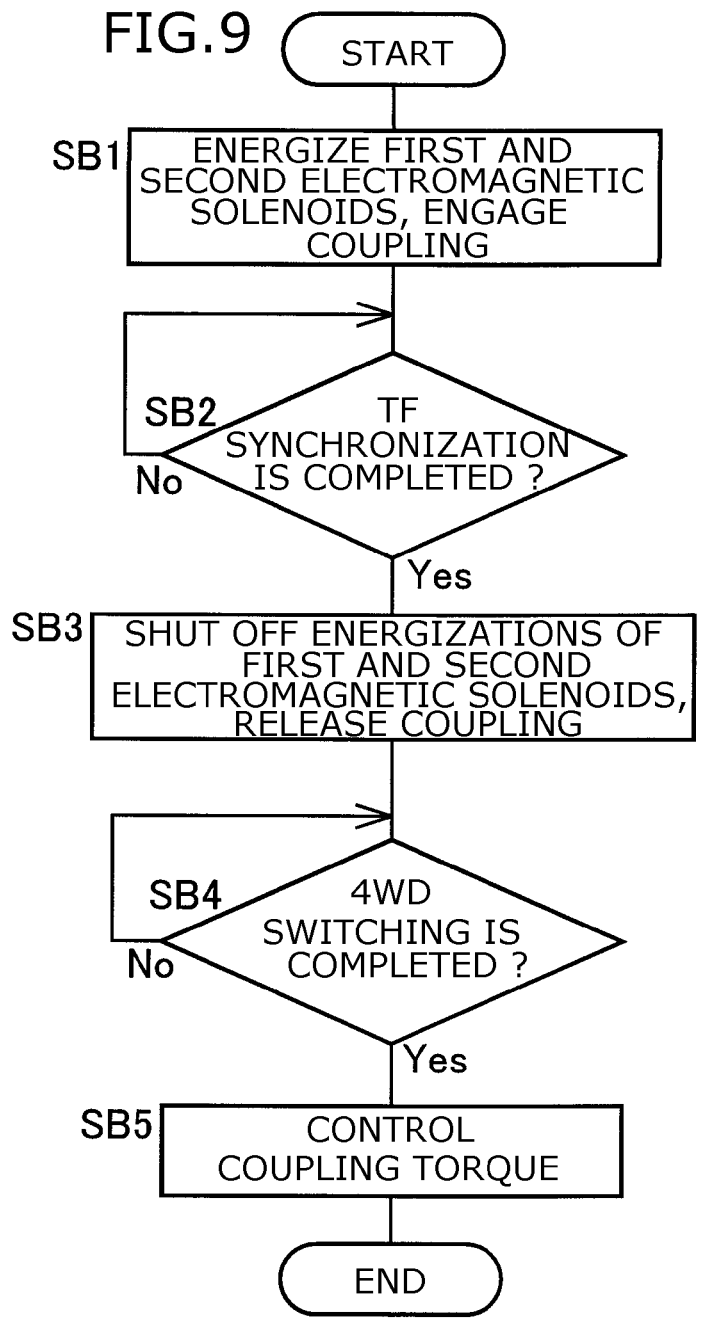
FIG. 9 is a flowchart illustrating the control operation when only a synchronization mechanism is provided in a first connection/disconnection mechanism that corresponds to other embodiment of the invention.

FIG. 9 is a flowchart illustrating the control operation of switching from the two-wheel drive to the four-wheel drive during traveling when only the synchronization mechanism 64 is provided in the first connection/disconnection mechanism 36. This flowchart is repeatedly executed with an extremely short cycle time of about several msec or several ten msec, for example.

When receiving an instruction to switch from the two-wheel drive to the four-wheel drive during traveling, in step SB1 (hereinafter, "step" is omitted) corresponding to the clutch control unit 140 and the coupling control unit 146, the coupling 22 is engaged, and the first electromagnetic solenoid 62 and the second electromagnetic solenoid 102 starts to be energized. Then, in SB2 corresponding to the synchronization determination unit 142, it is determined whether the rotations of the first rotary member 32 and the second rotary member 34 are synchronized (TF synchronization) by the first synchronization mechanism 64. SB2 is repeatedly executed until the first rotary member 32 and the second rotary member 34 are rotated in synchronization. Then, if the first rotary member 32 and the second rotary member 34 are rotated in synchronization, the first connection/disconnection mechanism 36 can be connected, and SB2 is positive and proceeds to SB3. If the first rotary member 32 and the second rotary member 34 are rotated in synchronization and the coupling 22 is engaged, the rotation is transmitted to the third rotary member 50, and therefore the third rotary member 50 and the fourth rotary member 52 also are rotated in synchronization. In other words, the second connection/disconnection mechanism 54 is also rotated in synchronization and thus can be connected.

In SB3 corresponding to the clutch control unit 140 and the coupling control unit 146, the energizations of the first electromagnetic solenoid 62 and the second electromagnetic solenoid 102 are shut off, and the coupling 22 is released. Here, the coupling 22 is released in order to reduce the resistance force when connecting the first connection/disconnection mechanism 36 and the second connection/disconnection mechanism 54. In SB4 corresponding to the switching determination unit 144, it is determined whether the switching to the four-wheel drive is completed. SB4 are repeatedly executed until the switching to the four-wheel drive is completed. If the switching to the four-wheel drive is completed and SA4 is positive, in SA5 corresponding to the coupling control unit 146, the torque capacity of the coupling 22 is controlled to a value corresponding to the traveling state of the vehicle.

The flowchart of FIG. 9 is a flowchart of switching from the two-wheel drive to the four-wheel drive. However, when switching from the four-wheel drive to the two-wheel drive, since the rotations of synchronization mechanisms are not required to be synchronized, the torque capacity of the coupling 22 starts to be decreased at the same time or substantially the same time when the first electromagnetic solenoid 62 and the second electromagnetic solenoid 102 are energized.

As described above, even if only the first synchronization mechanism 64 is provided in the first connection/disconnection mechanism 36 as in this embodiment, it is possible to switch the drive state of the four-wheel drive apparatus quickly. That is, in a state where the coupling 22 is engaged and the first connection/disconnection mechanism 36 that is provided with the first synchronization mechanism 64 is rotated in synchronization, the second connection/disconnection mechanism 54 that is not provided with the synchronization mechanism is also rotated in synchronization and can be connected. Thus, the coupling 22, the first electromagnetic solenoid 62, and a second electromagnetic solenoid 102 can be actuated at the same time or substantially the same time, and the first connection/disconnection mechanism 36 and the second connection/disconnection mechanism 54 can be connected quickly.

Figure 10:
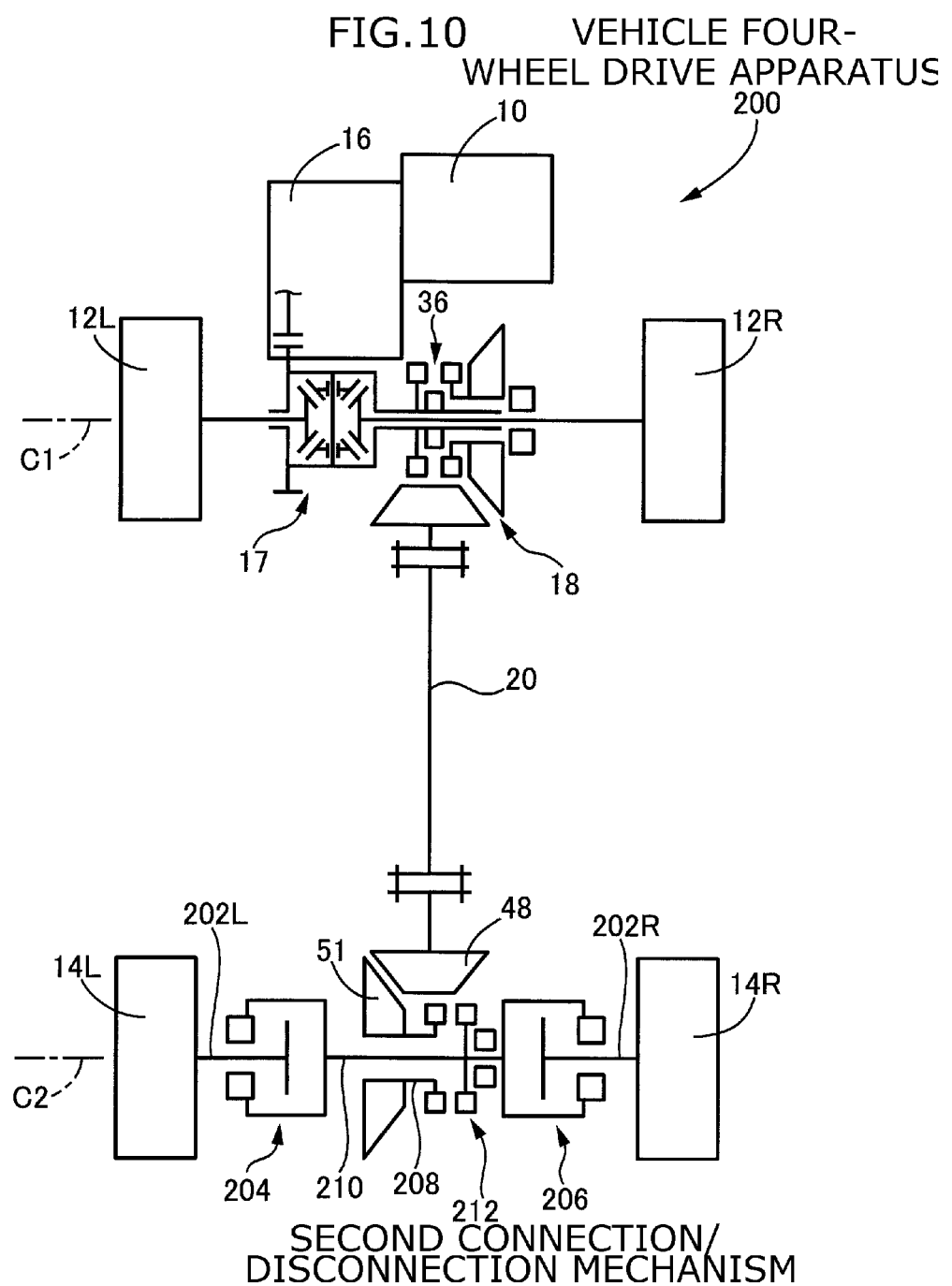
FIG. 10 is an overall view schematically showing a configuration of a vehicle four-wheel drive apparatus that is another embodiment of the invention.

FIG. 10 is an overall view schematically showing a configuration of a vehicle four-wheel drive apparatus 200 (four-wheel drive apparatus 200) that is another embodiment of the invention. When comparing the four-wheel drive apparatus 200 with the four-wheel drive apparatus 8 as described above, the structure of the front wheel side is the same while the structure of the rear wheel side is different. Specifically, the four-wheel drive apparatus 200 includes a left driving force distribution clutch 204 and a right driving force distribution clutch 206 that are provided on right and left rear wheel axles 202 respectively for controlling left driving force distribution and right driving force distribution, but does not have a coupling and a rear differential. The structure of the rear wheel side which is different from that of the above four-wheel drive apparatus 8 will be described below.

A propeller shaft 20 is connected to a drive pinion 48 for transmitting power to the rear wheel side, and the drive pinion 48 is engaged with a ring gear 51 that is provided to be rotatable around a rotation axis C2. The ring gear 51 is connected to a third rotary member 208 that is provided to be rotatable around the rotation axis C2. Further, a fourth rotary member 210 that connects the left driving force distribution clutch 204 and the right driving force distribution clutch 206 is provided on the inner peripheral side of the third rotary member 208 such that it is rotatable around the rotation axis C2. Moreover, a second connection/disconnection mechanism 212 is provided for connecting or disconnecting the third rotary member 208 and the fourth rotary member 210. Although not shown in FIG. 10, the following is provided: a second thrust force amplification mechanism that generates a thrust force for switching a connection/disconnection state of the second connection/disconnection mechanism 212, a second control clutch that is provided to connect or disconnect the second thrust force amplification mechanism and a non-rotary member, an electromagnetic solenoid that generates a torque for connecting the second control clutch, and a synchronization mechanism that causes the third rotary member 208 and the fourth rotary member 210 to rotate in synchronization.

In the four-wheel drive apparatus 200 that is configured as described above, since the mechanism for switching the connection/disconnection state of the second connection/disconnection mechanism 212 is not changed essentially as compared with the above four-wheel drive apparatus 8, the responsivity of switching of the connection/disconnection mechanism 212 is also high. Further, since the front wheel side is not changed as compared with that of the above four-wheel drive apparatus 8, the responsivity of switching of the first connection/disconnection mechanism 36 is high, and thus the responsivities of the switching of the first connection/disconnection mechanism 36 and the second connection/disconnection mechanism 212 both are high, and the switching of the drive state of the four-wheel drive apparatus 200 has a high responsivity. Therefore, it is possible to obtain the same effect as that of the above embodiment in the four-wheel drive apparatus 200. In addition, the detailed structure and operation of the four-wheel drive apparatus 200 are omitted as they are not changed essentially as compared with the above embodiment.

Although the embodiments of the invention have been described above based on the drawings, the invention is also applicable in other manners.

Figure 11:
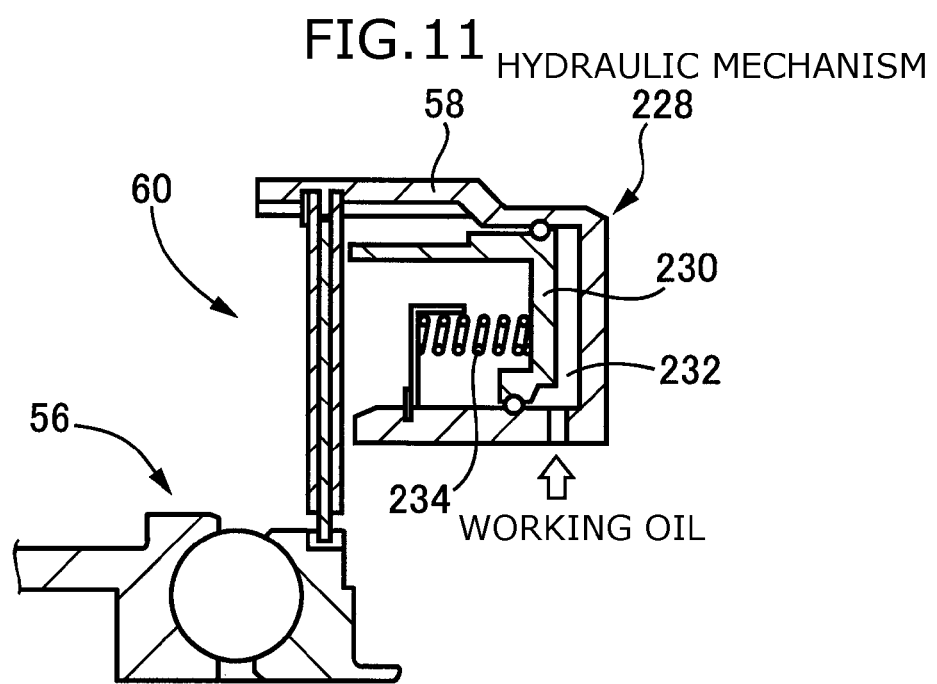
FIG. 11 is a diagram showing a structure in a case where a hydraulic mechanism is used as an actuator for switching an engagement state of a first control clutch.

For example, although the engagement states of the first control clutch 60 and the second control clutch 100 are switched by using the attraction forces of the electromagnetic solenoids in the above embodiments, the invention is not limited to the electromagnetic solenoid. For example, the engagement state of the control clutch may be switched by a hydraulic mechanism as shown in FIG. 11. FIG. 11 simply shows a sectional view in a case where the first control clutch 60 is controlled by a hydraulic mechanism 228 as an example. As shown in FIG. 11, the hydraulic mechanism 228 is configured to include a piston 230 that is fitted in the transfer casing 58 and presses the friction engagement element of the first control clutch 60, a spring 234 that acts on the piston 230 to the side away from the friction engagement element, and a hydraulic chamber 232 that is an oil-tight space surrounded by the piston 230 and the spring 234. Further, it is configured that working oil is supplied to the hydraulic chamber 232 to resist the action force of the spring 234, and the piston 230 presses the friction engagement element. As described above, even if the hydraulic mechanism 228 is used as an actuator for switching the engagement states of the first control clutch and the second control clutch, the same effect as that of the above embodiment can be achieved.

Figure 12:
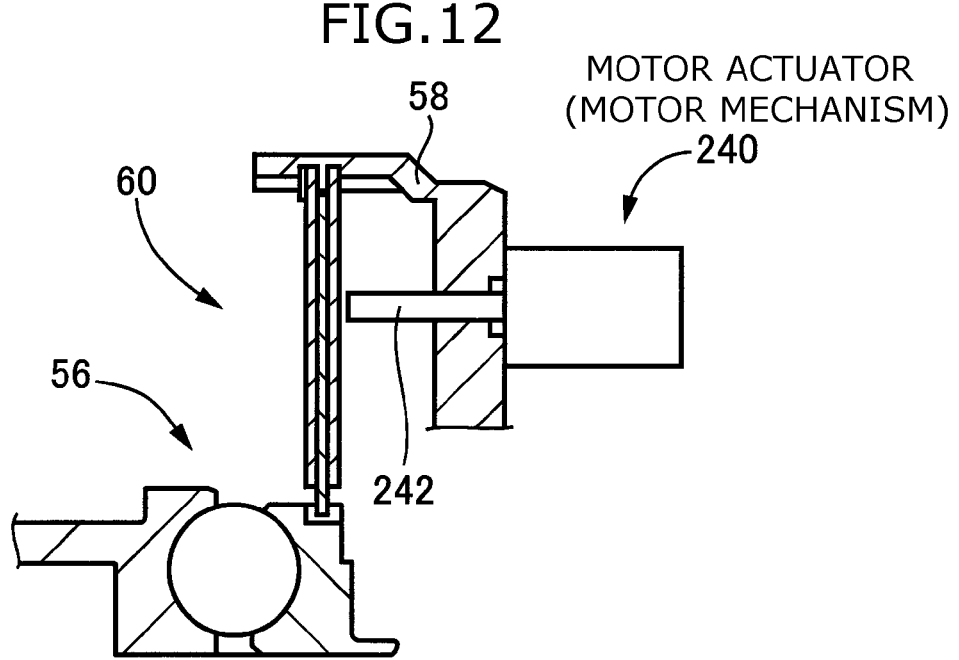
FIG. 12 is a diagram showing a structure in a case where a motor mechanism is used as an actuator for switching an engagement state of a first control clutch.

Further, a motor may be used as an actuator for switching the engagement states of the first control clutch 60 and the second control clutch 100. FIG. 12 shows a structure in a case where a motor mechanism is used as an actuator for switching the engagement state of the first control clutch 60 as an example. The motor actuator 240 that functions as the motor mechanism shown in FIG. 12 is provided inside with a mechanism for converting a rotation motion of a ball screw or the like into a reciprocation motion, and causes a shaft 242 protruding from the motor actuator 240 to reciprocate. Further, by controlling the motor actuator 240, the friction engagement element of the first control clutch 60 can be pressed by the shaft 242. Even if it is configured as described above, the engagement state of the first control clutch 60 can be switched by the motor actuator 240. Thus, even if the motor mechanism is used as an actuator for switching the engagement states of the first control clutch and the second control clutch, the same effect as that of the above embodiment can be achieved.

Further, in the above embodiments, for the first thrust force amplification mechanism 56, if the first cam 74 and the second cam 76 are rotated relative to each other, the first cam 74 and second cam 76 are expanded in the axial direction by the ball 78. However, the invention is not limited to the ball 78. For example, it may be a structure in which a first cam 254 and a second cam 256 constituting a first thrust force amplification mechanism 252 are expanded in the axial direction by a rotary cam 250 as shown in FIG. 13A and FIG. 13B. In FIG. 13A and FIG. 13B, cam grooves 254a and 256a constituting the rotary cam 250 are formed on the first cam 254 and the second cam 256. In a state where the first cam 254 and the second cam 256 are rotated integrally, as shown in FIG. 13A, the cam grooves 254a and 256a are fitted to each other. However, if the first control clutch is engaged and thus the rotation of the first cam 254 is stopped, as shown in FIG. 13B, the first cam 254 and the second cam 256 are rotated relative to each other, and the first cam 254 and the second cam 256 are expanded in the axial direction along the cam grooves 254a and 256a of each other. Thus, even if the first thrust force amplification mechanism and the second thrust force amplification mechanism are configured of the rotary cam 250, the same effect as that of the above embodiment can be achieved. In addition, other implementations of the thrust force amplification mechanism can be appropriately applied as long as it is configured to convert a rotation motion of a ball screw or the like into a reciprocation motion.

Further, although electromagnetic solenoids are used as actuators for switching the engagement states of the first control clutch 60 and the second control clutch 100 in the above embodiments, different actuators may be used such that the first control clutch 60 is switched by an electromagnetic solenoid while the second control clutch 100 is switched by a hydraulic mechanism, for example.

Further, although the pressing teeth 76a and 76b are formed on the second cam 76, the protrusions 80a are formed on the piston 80, and the latching teeth 94a and 94b are formed on the first holder 94 in the above embodiments, the shape of these teeth is an example and can be appropriately modified in a range of mechanically latching the piston 80.

Further, although the four-wheel drive apparatuses 8 and 200 of the above embodiments are FF based four-wheel drive apparatuses, the invention may also be applied to other four-wheel drive apparatus such as a FR based four-wheel drive apparatus, as long as it is configured to include a connection/disconnection mechanism for disconnecting the power transmission to the propeller shaft.

Further, although the first holders 94 and 108 are provided for mechanically maintaining the piston in the above embodiments, the first holders 94 and 108 are not necessary and can be omitted. However, it is necessary to energize the second electromagnetic solenoid 102 while maintaining the piston, for example, it is not advantageous to fuel efficiency.

Further, although the coupling 22 is provided in the four-wheel drive apparatus 8 of the embodiment as described above, the coupling 22 is not necessary, and the invention can be embodied with a structure which removes the coupling 22.

Further, although the synchronization mechanism is provided on both the first connection/disconnection mechanism 36 and the second connection/disconnection mechanism 54 or provided only on the first connection/disconnection mechanism 36 in the above embodiments, the synchronization mechanism may be provided only on the second connection/disconnection mechanism 54.

Note that, the above embodiments are merely implementations, and the invention can be embodied with various modifications and improvements based on knowledge of those skilled in the art.

What is claimed is:

1. A vehicle four-wheel drive apparatus comprising:
   a transfer for transmitting a portion of driving force that is output from a drive source to auxiliary drive wheels;
   a propeller shaft that is interposed between the transfer and the auxiliary drive wheels for transmitting a power from the transfer to the auxiliary drive wheels;
   a first connection/disconnection mechanism that is provided in the transfer for selectively connecting or disconnecting the power transmitted to the propeller shaft via the transfer;
   a second connection/disconnection mechanism that is provided between a downstream side of the propeller shaft and the auxiliary drive wheels for selectively connecting or disconnecting the power between the propeller shaft and the auxiliary drive wheels,
   a first thrust force amplification mechanism for switching a connection/disconnection state of the first connection/disconnection mechanism;
   a first control clutch;
   a first actuator;
   a second thrust force amplification mechanism for switching connection/disconnection state of the second connection/disconnection mechanism;
   a second control clutch; and
   a second actuator,
   wherein each of the first connection/disconnection mechanism and the second connection/disconnection mechanism has a switching member, the switching member is configured to be movable in an axial direction of a rotation axis so as to obtain a first position at which a power input shaft and a power output shaft that are rotatable around the rotation axis respectively are connected and a second position at which the power input shaft and the power output shaft that are rotatable around the rotation axis respectively are disconnected,
   wherein each of the first thrust force amplification mechanism and the second thrust force amplification mechanism is configured to have a pair of rotary members that is rotatable around the rotation axis, the pair of rotary members is configured to be axially separated by being rotated relative to each other, and one of the pair of rotary members causes the switching member of each connection/disconnection mechanism to move in one direction of the rotation axis,
   wherein a first rotation suppression torque is able to be added to the other one of the pair of rotary members by the first control clutch through the first actuator,
   wherein a second rotation suppression torque is able to be added to the other one of the pair of rotary members by the second control clutch through the second actuator,
   wherein one of the pair of rotary members of each of the first thrust force amplification mechanism and the second thrust force amplification mechanism is connected to a rotary member whose rotating speed is increased in proportion to a vehicle speed in a non-rotatable relatively manner respectively, and
   wherein at least one of the first connection/disconnection mechanism and the second connection/disconnection mechanism is provided with a synchronization mechanism for synchronizing the rotations of the power input shaft and the power output shaft.

2. The vehicle four-wheel drive apparatus according to claim 1, wherein each of the first thrust force amplification mechanism and the second thrust force amplification mechanism is a ball cam or a rotary cam.

3. The vehicle four-wheel drive apparatus according to claim 1, wherein each of the first actuator and the second actuator is configured of an electromagnetic solenoid, a motor mechanism or a hydraulic mechanism.

4. The vehicle four-wheel drive apparatus according to claim 1, wherein the vehicle four-wheel drive apparatus is further provided with a fixing mechanism for maintaining the connection/disconnection states of the first connection/disconnection mechanism and the second connection/disconnection mechanism.

5. The vehicle four-wheel drive apparatus according to claim 1, wherein an electronic control coupling is provided in a power transmission path between the propeller shaft and the auxiliary drive wheels for controlling a torque transmitted to the auxiliary drive wheels.

6. The vehicle four-wheel drive apparatus according to claim 5, wherein:
   the vehicle four-wheel drive apparatus is further provided with a control device for switching connection or disconnection of the first connection/disconnection mechanism and the second connection/disconnection mechanism; and
   in a case where each of the first connection/disconnection mechanism and the second connection/disconnection mechanism is provided with the synchronization mechanism, when the first connection/disconnection mechanism and the second connection/disconnection mechanism are to be connected during traveling, the control device releases the electronic control coupling and actuates the first actuator and the second actuator.

7. The vehicle four-wheel drive apparatus according to claim 5, wherein:
   the vehicle four-wheel drive apparatus is further provided with a control device for switching connection or disconnection of the first connection/disconnection mechanism and the second connection/disconnection mechanism; and
   in a case where only one of the first connection/disconnection mechanism and the second connection/disconnection mechanism is provided with the synchronization mechanism, when the first connection/disconnection mechanism and the second connection/ disconnection mechanism are to be connected during traveling, the control device engages the electronic control coupling and actuates the first actuator and the second actuator.

* * * * *